(12) United States Patent
Barreto et al.

(10) Patent No.: US 8,793,331 B2
(45) Date of Patent: Jul. 29, 2014

(54) MULTIMEDIA REDIRECTION

(75) Inventors: Daniel Ernesto Barreto, San Francisco, CA (US); Nitin Gupta, Karnataka (IN); Nandakumar Sarun Madarakal, Kerala (IN); Mike Chih-Kang Liang, San Ramon, CA (US); Richard Junjie Chen, Beijing (CN)

(73) Assignee: Wyse Technology L.L.C., San Jose, CA (US)

( * ) Notice: Subject to any disclaimer, the term of this patent is extended or adjusted under 35 U.S.C. 154(b) by 274 days.

(21) Appl. No.: 12/464,857

(22) Filed: May 12, 2009

(65) Prior Publication Data

US 2010/0106798 A1 Apr. 29, 2010

Related U.S. Application Data

(60) Provisional application No. 61/054,110, filed on May 16, 2008.

(51) Int. Cl.
*G06F 15/16* (2006.01)

(52) U.S. Cl.
USPC ........... 709/217; 709/203; 709/219; 709/227; 709/229; 709/231

(58) Field of Classification Search
USPC .................. 709/217, 203, 219, 227, 229, 231
See application file for complete search history.

(56) References Cited

U.S. PATENT DOCUMENTS

| | | | |
|---|---|---|---|
| 6,895,588 B1 | 5/2005 | Ruberg | |
| 7,017,162 B2 | 3/2006 | Smith et al. | |
| 7,111,106 B2 | 9/2006 | Ohnishi | |
| 7,269,832 B2 | 9/2007 | Bodin et al. | |
| 7,349,391 B2 | 3/2008 | Ben-Dor et al. | |
| 2002/0118952 A1* | 8/2002 | Nakajima et al. | 386/69 |
| 2003/0061401 A1 | 3/2003 | Luciani | |
| 2004/0243883 A1* | 12/2004 | Shankar et al. | 714/38 |

(Continued)

FOREIGN PATENT DOCUMENTS

| | | |
|---|---|---|
| EP | 1 043 876 | 10/2000 |
| EP | 1 681 824 | 7/2006 |

OTHER PUBLICATIONS

Ciciora, et al., "An Introduction to Teletext and Viewdata With Comments on Compatibility", IEEE Transaction on Consumer Electronics, Jul. 1979, pp. 235-245, vol. CE-25, No. 3.

(Continued)

*Primary Examiner* — Rupal Dharia
*Assistant Examiner* — Mohammed Ahmed
(74) *Attorney, Agent, or Firm* — Baker Botts L.L.P.

(57) ABSTRACT

A system for receiving redirected electronic media playback includes a proxy configured to communicate with a remote access module. The remote access module is configured to establish a remote access connection between the system and a remote system. The proxy is configured to receive, over the remote access connection, a decode request for electronic media content designated for a local multimedia application on the system, and in return, provide a result for the request. The proxy is also configured to receive at least one playback command designated for playing the electronic media content on the local multimedia application. The electronic media appears to be playing on a remote multimedia application on the remote system corresponding to the local multimedia application, but is played on the local multimedia application. A system for redirecting playback of electronic media content to a remote system, methods, and machine-readable media are also provided.

52 Claims, 15 Drawing Sheets

(56) References Cited

U.S. PATENT DOCUMENTS

| | | | |
|---|---|---|---|
| 2004/0255276 A1 | 12/2004 | Rovang | |
| 2005/0166234 A1* | 7/2005 | Jarman | 725/46 |
| 2005/0212798 A1* | 9/2005 | Lefebvre et al. | 345/419 |
| 2006/0070090 A1 | 3/2006 | Gulkis | |
| 2006/0095472 A1* | 5/2006 | Krikorian et al. | 707/104.1 |
| 2006/0281451 A1 | 12/2006 | Zur | |
| 2007/0005783 A1* | 1/2007 | Saint-Hillaire et al. | 709/230 |
| 2007/0005867 A1* | 1/2007 | Diamant | 710/306 |
| 2007/0011446 A1 | 1/2007 | Kato et al. | |
| 2007/0061477 A1* | 3/2007 | Stoyanov et al. | 709/230 |
| 2007/0061814 A1 | 3/2007 | Choi et al. | |
| 2007/0088805 A1* | 4/2007 | Cyster | 709/217 |
| 2007/0192806 A1* | 8/2007 | Park et al. | 725/80 |
| 2007/0198674 A1* | 8/2007 | Li et al. | 709/223 |
| 2007/0250863 A1* | 10/2007 | Ferguson | 725/46 |
| 2007/0258698 A1* | 11/2007 | Okada et al. | 386/95 |
| 2008/0168118 A1 | 7/2008 | Hickey et al. | |
| 2009/0034931 A1* | 2/2009 | Stone et al. | 386/52 |
| 2009/0248802 A1* | 10/2009 | Mahajan et al. | 709/204 |
| 2009/0248885 A1* | 10/2009 | Patwardhan et al. | 709/230 |
| 2010/0146076 A1* | 6/2010 | Adriazola et al. | 709/219 |
| 2010/0198943 A1* | 8/2010 | Harrang et al. | 709/217 |

OTHER PUBLICATIONS

Harden, et al., "Teletext/Viewdata LSI", IEEE Transactions on Consumer Electronics, Jul. 1979, pp. 353-358, vol. CE-25, No. 3.

Hedger, et al., "Telesoftware: Home Computing Via Broadcast Teletext", IEEE Transactions on Consumer Electronics, Jul. 1979, pp. 2679-287, vol. CE-25, No. 3.

Robinson, et al., "'Touch-Tone' Teletext a Combined Teletext-Viewdata System", IEEE Transactions on Consumer Electronics, Jul. 1979, pp. 298-303, vol. CE-25, No. 3.

Wonhong Kwon et al., "Design and Implementation of Peripheral Sharing Mechanism on Pervasive Computing With Heterogeneous Environment", Software Technologies for Embedded and Ubiquitous Systems [Lecture Notes in Computer Science], May 7, 2007, pp. 537-546, Springer Berlin Heidelberg.

http://www.fabulatech.com/products.html; FabulaTech Products; 3 pgs.

http://www.fabulatech.com/usb-over-network.html; USB over Network; 4 pgs.

http://support.citrix.com/article/CTX816193; CITRIX Knowledge Center; USB Support in MetaFrame Products; Oct. 8, 2001; May 15, 2007; document ID: CTX 816193; 3 pgs.

http://blogs.msdn.com/ts/archive/2006/12/05/terminal-server-plug-and-play-device-redirection-framework-in-vista-and-longhorn-part-1.aspx; Terminal Services Team Blog; Terminal Server Plug and Play Device Redirection Framework in Vista and Longhorn; Part 1; 4 pgs.

European Office Action; Application No. 09 160 44.7-1952; pp. 8, Jul. 8, 2013.

* cited by examiner

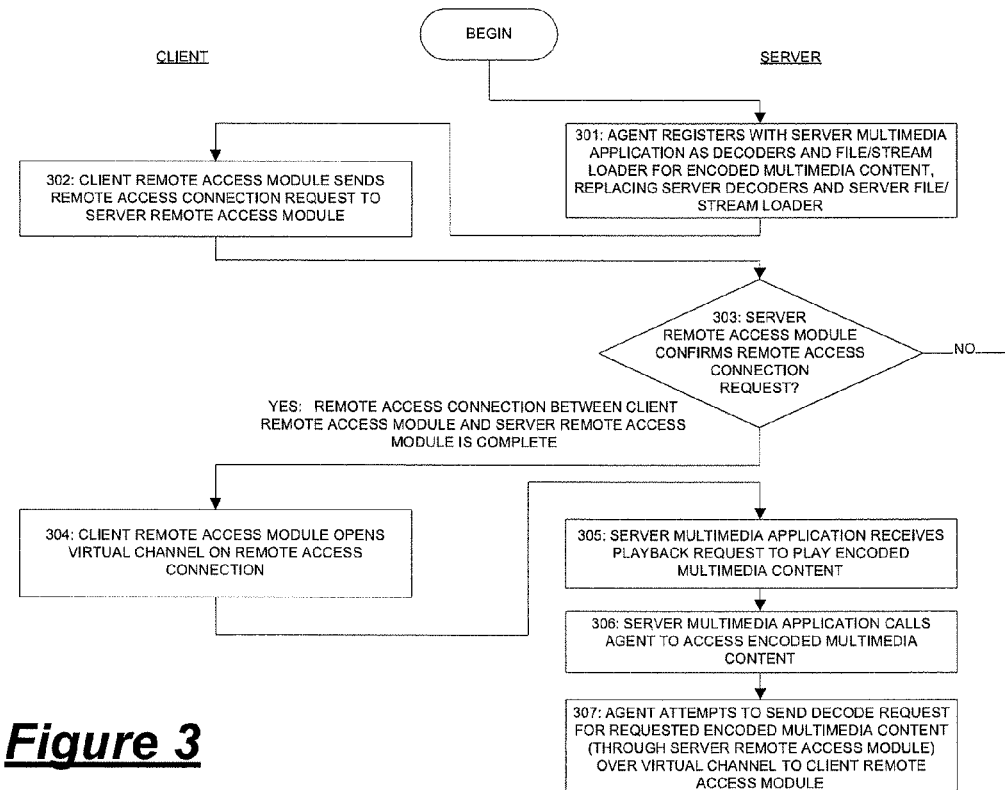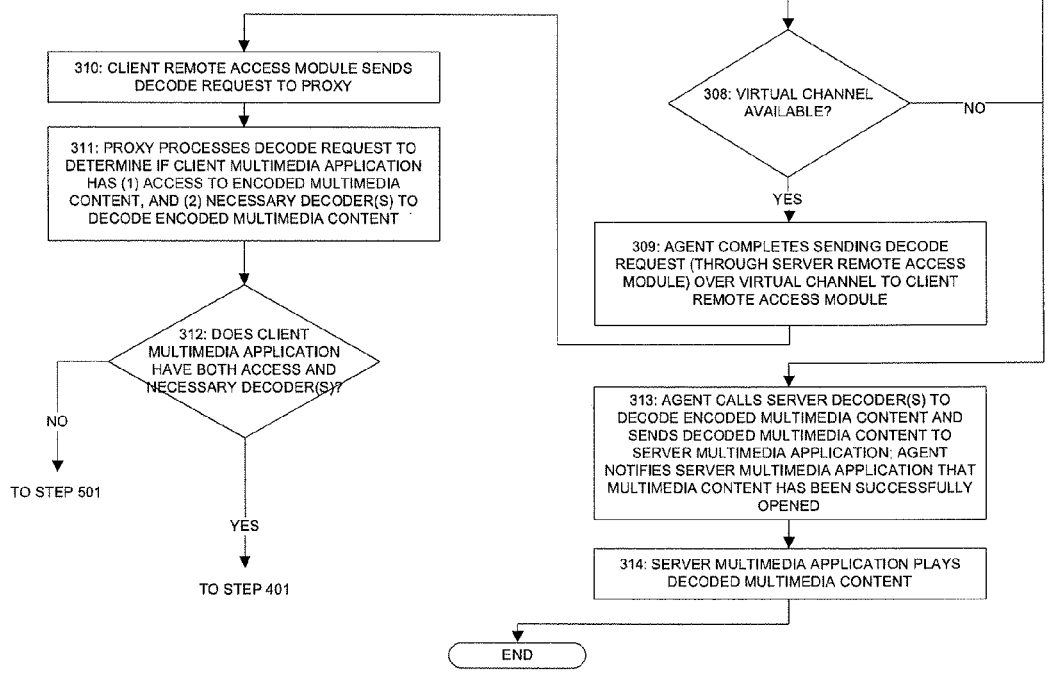
Figure 3

MULTIMEDIA REDIRECTION

CROSS-REFERENCE TO RELATED APPLICATION

The present application claims the benefit of priority under 35 U.S.C. §119 from U.S. Provisional Patent Application Ser. No. 61/054,110 entitled "MULTIMEDIA REDIRECTION," filed on May 16, 2008, the disclosure of which is hereby incorporated by reference in its entirety for all purposes.

BACKGROUND

1. Field

The subject technology relates generally to remote computing and, in particular, relates to redirecting multimedia playback to a remote computer.

2. Background

One approach to the design and implementation of computer networks, particularly with regard to the development of client/server applications, includes designing client applications and client devices so that the majority of the heavily used resources are at a remote computing device, such as a centralized server, connected via network. These client devices, which include devices connected to a monitor and keyboard, mobile intelligent devices ("MID"), netbooks, personal computers, or telephones, generally have minimal memory, disk storage, and processor power, but are designed under the premise that most users connected to a powerful server do not need the additional processing power. With these client devices, the total cost of ownership is minimized, because of the reduced resources, and security is increased, because the clients can be centrally administered and updated from the server.

Frequently, multimedia content, such as multimedia files and/or video conferencing, are shared amongst a large number of clients. For example, in a business with geographically isolated offices, multiple clients may want to participate in a videoconference. In order for the client to participate in the videoconference, the server usually has to open the requested multimedia stream and send images and sound of the server-side multimedia playback that are "captured" or "scraped" (i.e., an image, such as a bitmap image, is taken of the server-side screen during multimedia playback, which includes a decompressed frame of the video, or in the case of audio, a predetermined portion of audio is recorded as it is played) while the videoconference file is played on the server. The screen-captured images are subsequently displayed (or in the case of audio, replayed) to the client (client-side viewer) connected to the server.

Unfortunately, because this media (e.g., multimedia) information is downloaded by the server, as well as captured and transmitted in an uncompressed format, a heavy load is placed on the network connection between the server and the client, and significant delay is added for the case of real-time applications (e.g. video conferencing). As a result, playback to the client-side viewer is usually interrupted, and playback is of poor quality (e.g., the refresh rate of the screen captured images is too low), often containing errors such as noise or a lack of synchronization between audio and video.

Alternatively, client systems may be required to download the entire multimedia file before being able to play the file, thus creating a significant delay between requesting to view a multimedia file, and actually viewing the multimedia file.

Furthermore, if several clients connect to and request a multimedia file from a single server (unicasting), the total processing and transfer burden to the network connecting the clients and server may render playback and/or download too slow or error-filled so as to be useless to the users attempting to view the multimedia, reducing the scalability of this approach.

SUMMARY

In accordance with one aspect of the disclosure, a system for receiving redirected electronic media playback includes a proxy configured to communicate with a remote access module, the remote access module configured to establish a remote access connection between the system and a remote system, the proxy further configured to receive, from the remote system over the remote access connection, at least one decode request for electronic media content designated for a local multimedia application on the system, the proxy further configured to provide, to the remote system over the remote access connection, a result of the at least one decode request, the proxy further configured to receive, from the remote system over the remote access connection, at least one playback command designated for playing the electronic media content on the local multimedia application, and the proxy further configured to provide, to the remote system over the remote access connection, a playback status of the electronic media content on the local multimedia application. The proxy is configured to allow the electronic media content to appear to be playing on a remote multimedia application on the remote system corresponding to the local multimedia application on the system, when the electronic media content is played on the local multimedia application.

According to another aspect of the present disclosure, a system for redirecting electronic media playback includes an agent configured to communicate with a remote access module, the remote access module configured to establish a remote access connection between the system and a remote system, the agent configured to register with a local multimedia application on the system, the agent further configured to receive, from the local multimedia application, a playback request for electronic media content, the agent further configured to send, to the remote system over the remote access connection, at least one decode request for the electronic media content, the agent further configured to receive, from the remote system over the remote access connection, a result of the at least one decode request, and the agent further configured to send, to the remote system over the remote access connection, a playback command for the electronic media content. The playback request for the electronic media content is designated for the system and the playback command for the electronic media content is designated for the remote system. The system is configured to have the electronic media content played on the remote system as a result of the playback command.

According to a further aspect of the present disclosure, a method for receiving and playing redirected electronic media on a system includes communicating with a remote access module, the remote access module configured to establish a remote access connection between the system and a remote system and receiving, over the remote access connection, at least one decode request for electronic media content designated for a local multimedia application on the system. The method also includes providing, over the remote access connection, a result of the at least one decode request, and receiving, from the remote system over the remote access connection, at least one playback command designated for playing the electronic media content on the local multimedia application. The method further includes providing, to the remote system over the remote access connection, a playback status of the electronic media content on the local multimedia application. The system is configured to allow the electronic media content to appear to be playing on a remote multimedia application on the remote system corresponding to the local multimedia application on the system, when the electronic media content is played on the local multimedia application.

According to yet a further aspect of the present disclosure, a method for redirecting playback of electronic media to a remote system includes communicating with a remote access module, the remote access module configured to establish a remote access connection between a system and the remote system, and registering with a local multimedia application on the system. The method also includes receiving, from the local multimedia application, a playback request for electronic media content, and sending, over the remote access connection, at least one decode request for the electronic media content. The method further includes receiving, over the remote access connection, a result of the at least one decode request, and sending, over the remote access connection, a playback command for the electronic media content. The playback request for the electronic media content is designated for the system and the playback command for the electronic media content is designated for the remote system. The system is configured to have the electronic media content played on the remote system as a result of the playback command.

In another aspect of the present disclosure, a machine-readable medium encoded with instructions executable by a processor to perform a method for receiving and playing redirected electronic media is disclosed. The method includes communicating with a remote access module, the remote access module configured to establish a remote access connection between the system and a remote system, and receiving, over the remote access connection, at least one decode request for electronic media content designated for a local multimedia application on the system. The method also includes providing, over the remote access connection, a result of the at least one decode request, and receiving, from the remote system over the remote access connection, at least one playback command designated for playing the electronic media content on the local multimedia application. The method further includes providing, to the remote system over the remote access connection, a playback status of the electronic media content on the local multimedia application. The system is configured to allow the electronic media content to appear to be playing on a remote multimedia application on the remote system corresponding to the local multimedia application on the system, when the electronic media content is played on the local multimedia application.

In yet another aspect of the present disclosure, a machine-readable medium encoded with instructions executable by a processor to perform a method for redirecting playback of electronic media to a remote system is disclosed. The method includes communicating with a remote access module, the remote access module configured to establish a remote access connection between a system and the remote system, registering with a local multimedia application on the system, and receiving, from the local multimedia application, a playback request for electronic media content. The method also includes sending, over the remote access connection, at least one decode request for the electronic media content, and receiving, over the remote access connection, a result of the at least one decode request. The method further includes sending, over the remote access connection, a playback command for the electronic media content. The playback request for the electronic media content is designated for the system and the playback command for the electronic media content is designated for the remote system. The system is configured to have the electronic media content played on the remote system as a result of the playback command.

In a further aspect of the present disclosure, a system for receiving redirected electronic media playback includes means for communicating with a remote access module, the remote access module configured to establish a remote access connection between the system and a remote system. The system also includes means for receiving, over the remote access connection, at least one decode request for electronic media content designated for a local multimedia application on the system, and for providing, over the remote access connection, a result of the at least one decode request, and for receiving, from the remote system over the remote access connection, at least one playback command designated for playing the electronic media content on the local multimedia application, and for providing, to the remote system over the remote access connection, a playback status of the electronic media content on the local multimedia application. The system is configured to allow the electronic media content to appear to be playing on a remote multimedia application on the remote system corresponding to the local multimedia application on the system, when the electronic media content is played on the local multimedia application.

In another aspect of the present disclosure, a system for redirecting electronic media playback, includes means for communicating with a remote access module, the remote access module configured to establish a remote access connection between a system and the remote system, for receiving, from a local multimedia application on the system, a playback request for electronic media content, for sending, over the remote access connection, at least one decode request for the electronic media content, for receiving, over the remote access connection, a result of the at least one decode request; and for sending, over the remote access connection, a playback command for the electronic media content. The system also includes means for registering with the local multimedia application. The playback request for the electronic media content is designated for the system and the playback command for the electronic media content is designated for the remote system. The system is configured to have the electronic media content played on the remote system as a result of the playback command.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 3 is a flow chart depicting an exemplary process of a preliminary stage in redirecting multimedia playback from a local computing device to a remote computing device.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Figure 1:
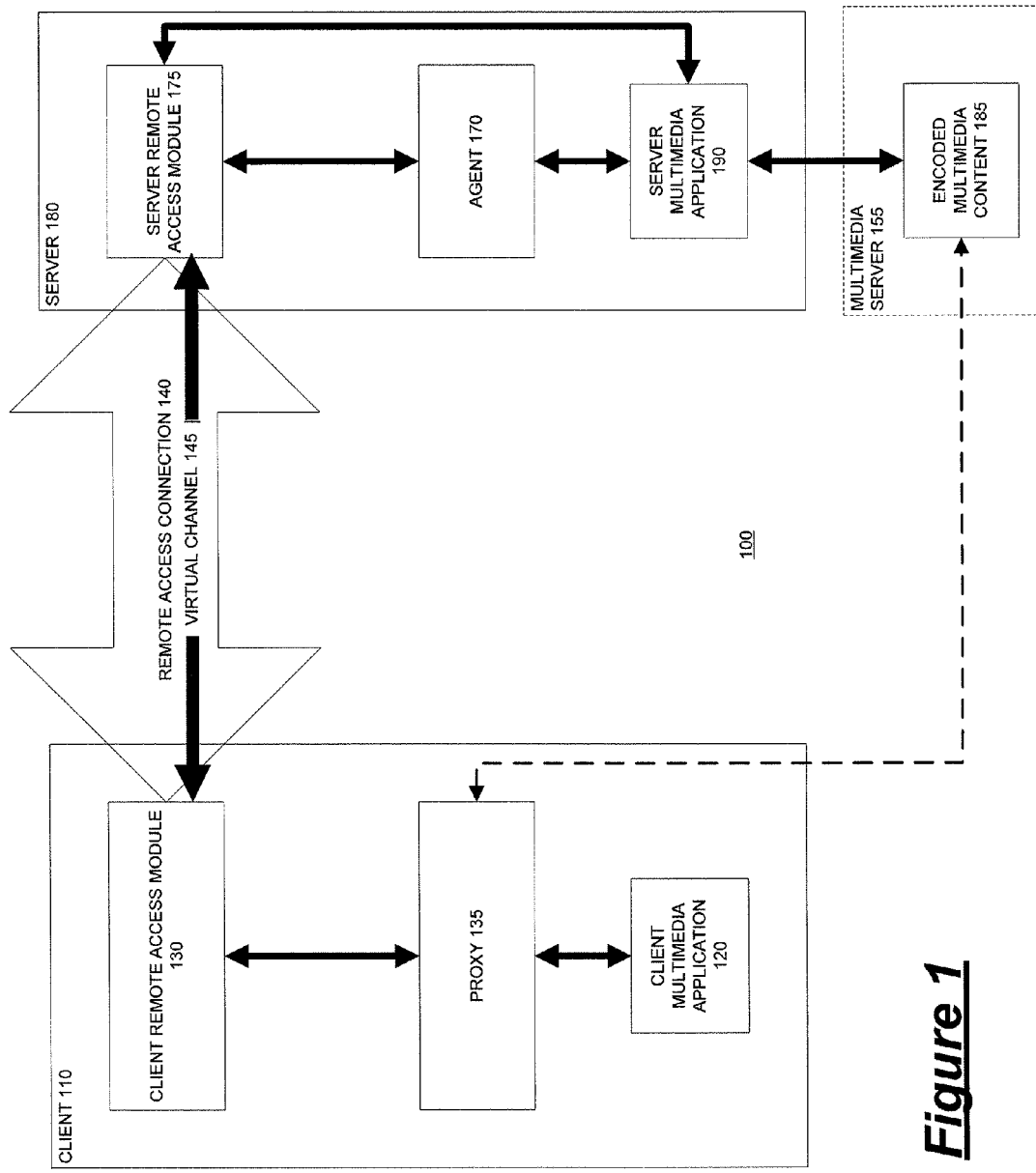
FIG. 1 is a block diagram of a multimedia redirection system in accordance with one configuration of the present disclosure.

Now referring to FIG. 1, a simplified diagram of a multimedia redirection system is illustrated in accordance with one configuration of the present disclosure. The multimedia redirection system 100 may include local client computing device 110 (client) in communication with remote server computing device 180 (server) using remote access connection 140 and virtual channel 145. Client 110 may include proxy 135, client remote access module 130, and client multimedia application 120. Server 180 may include server remote access module 175, agent 170, and server multimedia application 190. According to one aspect of the disclosure, redirection of multimedia includes the instance of passing the responsibility for processing the playback of multimedia after a certain point (during the playback) from a first system (e.g., server 180) to a second system (e.g., client 110).

Server 180 has access to encoded multimedia content 185. Multimedia content 185 can include, without limitation, audio information, video information, image information, multi-dimensional graphics (i.e., 2D or 3D graphics), text, or a combination thereof. According to one aspect of the disclosure illustrated, multimedia content 185 is encoded. Sample encoding formats include, without limitation, Joint Photographic Experts Group (JPEG) standards, Moving Picture Experts Group (MPEG) standards (such as MPEG-1, MPEG-2, MPEG-3, and MPEG-4, and their constituent parts, versions, and profiles), Audio Codec 3 (AC3), Advanced Audio Coding (AAC), Windows Media Video (WMV), Windows Media Audio (WMA), Digital Video Express (DivX), Waveform Audio (WAV), Adobe Flash, RealAudio (RA), RealVideo (RV), and RealMedia (RM) and other types of data that can be categorized as multimedia content. According to another aspect of the disclosure (not illustrated), multimedia content 185 is not encoded. Encoded multimedia content 185 may be encoded in a streaming format, in which portions of the multimedia content are configured to be played as they are delivered to a multimedia application, or in a non-streaming format, in which the multimedia content is configured to be played after the entire multimedia file has been delivered to the multimedia application. In certain embodiments, encoded multimedia content 185 can be used for live streaming through unicast or multicast transmission from multimedia server 155 over any protocol (e.g., UDP/TCP).

According to the exemplary configuration illustrated in FIG. 1, encoded multimedia content 185 may be stored or streamed by multimedia server 155 to which server multimedia application 190 has access. In certain cases, proxy 135 of client 110 may also have access to encoded multimedia content 185 on multimedia server 155, as discussed below with reference to steps 311-312 of FIG. 3.

Client remote access module 130 is configured to create remote access connection 140 with server remote access module 175 on server 180. Together, client remote access module 130 and server remote access module 175 are configured to allow client 110 to access server 180 over remote access connection 140. In one aspect of the disclosure, client remote access module 130 and server remote access module 175 may be configured to allow client 110 to remotely control server 180 over remote access connection 140. In another aspect of the disclosure, client remote access module 130 and server remote access module 175 may be configured to allow graphical user interface software to run remotely on server 180 so that it can be displayed locally on client 110. Exemplary remote access applications, which include client remote access module 130 and server remote access module 175 configured to create remote access connection 140, are the Microsoft® Remote Desktop Protocol (RDP) application and the Citrix® Independent Computing Architecture (ICA) application. The subject technology, however, is not limited to these exemplary remote access applications. Exemplary remote access applications can also have a broker software module sitting on a different system, or any of the two systems 110 and 180 described in FIG. 1. Examples can include Virtual Desktop Manager ("VDM") from VMWare, and XenDesktop technology from Citrix.

Client remote access module 130 can include an appropriate terminal service client dynamic link library as well as other static libraries for use with a remote connection. Client remote access module 130 may include a terminal service client dynamic link library for a remote access application such as the Microsoft® RDP application and the Citrix® ICA application. Server remote access module 175 similarly can include appropriate system service modules for use with a remote connection. Client remote access module 130 and server remote access module 175 can come pre-installed with the respective operating systems operating on client 110 and server 180. Alternatively, client remote access module 130 and server remote access module 175 can be later added or otherwise configured to operate with the respective operating systems operating on client 110 and server 180.

Client remote access module 130 can create virtual channel 145 using at least a portion of remote access connection 140. Virtual channel 145 is used for the transfer between proxy 135 of client 110 and agent 170 of server 180 of information related to the redirection of playback of encoded multimedia content 185. In one aspect of the disclosure, whenever a remote access connection session is closed, client remote access module 130 may instruct agent 170 to stop multimedia redirection to client 110 from server 180. According to another aspect of the disclosure, a socket connection between agent 170 and proxy 135 may be used instead of, or in addition to, virtual channel 145.

Redirecting the playback of multimedia content to and from a device is sometimes referred to as multimedia redirection. In one aspect of the disclosure, redirecting multimedia content (e.g., encoded multimedia content 185 accessible to server 180) to a remote system (e.g., client 110) allows the multimedia content to appear as if it were being played (including any necessary decoding and decompression) remotely on server 180 while in actuality it is being played locally on client 110. Accordingly, the multimedia content appears to be playing remotely on server 180 while benefiting from the advantages of local playback on client 110.

For example, a user of a client system (e.g., client 110) connected via a remote desktop connection (e.g., remote access connection 140) to a server (e.g., server 180) can use the server to visit a website displaying a multimedia webcast, and the webcast will be redirected to and played on the client system, within the remote desktop (e.g., client remote access module 130 and server remote access module 175), such that video for the webcast will play on a display device connected to the client system and audio for the webcast will play on an audio output device connected to the client system. In one aspect of the disclosure, a multimedia redirection system can provide when and with which system the multimedia redirection is to be performed, and a multimedia redirection system integrates the multimedia redirection feature with a remote access application.

According to one aspect of the disclosure, while virtual channel 145 and remote access connection 140 may share the same physical connection (to network 150 of FIG. 2) or the same physical communication path, each of virtual channel 145 and remote access connection 140 may comprise a distinct or separate communication "channel."

In one exemplary aspect of the disclosure, data packets having one type of header information may be viewed as forming one "channel." For instance, data packets having a first type of header information may be viewed as forming a first channel that is virtual channel 145. Data packets having a second type of header information may be viewed as forming a second channel that is remote access connection 140. For example, a first header could be labeled "MMR" and a second header could be labeled "RDP." Thus, information to be sent or received over virtual channel 145 may be contained in data packets having the first type of header information, and information to be sent or received over remote access connection 140 may be contained in data packets having the second type of header information. This is an exemplary illustration, and the subject technology is not limited to this example.

The following illustrates one exemplary usage of virtual channel 145 and remote access connection 140. Information related to the playback of encoded multimedia content 185, such as audio information, video information, and event information may be sent over virtual channel 145, while other requests, such as remote control requests of server 180 from client 110, may be sent over remote access connection 140. Event information, including both server events and client events, as discussed herein may include, without limitation, information regarding stopping playback, beginning playback, resuming playback, rewinding playback, forwarding playback, volume adjustment, screen size adjustment, screen location adjustment, reaching the end of the multimedia content, and encountering an error, such as a corruption in the multimedia content. Event information may also include other requests, commands, or adjustments associated with a multimedia content.

Client multimedia application 120 is configured to perform various operations with media files or streams, including the rendering of media. In one aspect of the disclosure, client multimedia application 120 is a multimedia framework and application programming interface, such as Microsoft Direct-Show®, Microsoft Media Foundation®, GStreamer or Apple Computer's QuickTime® framework.

Server multimedia application 180 is configured to play media files, including the rendering of media. In one aspect of the disclosure, server multimedia application 180 may be a digital media player used for playing audio, video, and viewing images, such as Windows Media Player®, Adobe Flash or Apple Computer's QuickTime®.

Proxy 135 on client 110 is configured to receive and process a decode request to determine if client multimedia application 120 has both access to encoded multimedia content 185, the decoder(s) necessary to decode encoded multimedia content 185 and support for the appropriate streaming protocols (e.g. RTP, RTSP, MMS, HTTP, etc). The decode request can include, without limitation, a location of the encoded multimedia content, and the detected type of encoding used to encode the encoded multimedia content. If proxy 135 determines client multimedia application 120 has both access to encoded multimedia content 185 including support for any required streaming protocols (e.g. RTP, RTSP, MMS, MSB, etc) and the decoder(s) necessary to decode encoded multimedia content 185, proxy 135 is configured to send a notification in this regard, as well as information regarding the encoded multimedia content (multimedia content information). Multimedia content information may include, without limitation, (1) audio information such as encoding type, number of channels, sampling rate, sample size, compression type, and play time (duration), (2) video information such as frame width and height, frame resolution, frame rate, play time (duration), number of frames, compression type, number of colors, and bit rate, or (3) image information such as height and width, number of colors, image content length, image content format, and image compression format. According to one aspect of the disclosure, multimedia content information may be included in the decode request. If proxy 135 determines client multimedia application 120 does not have both access to encoded multimedia content 185 and the decoder(s) necessary to decode encoded multimedia content 185, proxy 135 is configured to send a notification accordingly, such as, for example, an error notification.

Proxy 135 is also configured to execute server event commands on client multimedia application 120, such as to begin (e.g., a "start playback" command), resume, seek, stop, pause, adjust volume, adjust a video window, or otherwise affect playback of encoded multimedia content 185 on multimedia application 120, as discussed above, and send a notification regarding the successful execution of the command, accordingly. In certain embodiments, proxy 135 is configured to use a buffering mechanism to facilitate the playback of the encoded multimedia content 185.

Proxy 135 can also be configured to process a "color key" (a.k.a. "chroma key" or "blue screen") into a color key command. According to one aspect of the disclosure, a color key is used for mixing two images together, such that a first image is superimposed on a second image ("rendering screen"), and may include, without limitation, the position and size of the rendering screen. According to one aspect of the disclosure, the color key command is a command from proxy 135 in which proxy 135 commands client multimedia application 120 to display, on the display of client 110, the first image with a size and at a location equal to the rendering screen of the same size and at the same location displayed on the screen of server 180. According to one aspect of the disclosure, by using a color key to direct client multimedia application 120 to play encoded multimedia content 185 on a rendering screen, client remote access module 130 does not attempt to display any data from the rendering screen area of the display of server 180.

Proxy 135 may be further configured to receive and send encoded multimedia content as well as playback commands for the encoded multimedia content. Proxy 135 may be further configured to send a notification that playback of encoded multimedia content has begun on client multimedia application 120.

In one aspect of the disclosure, proxy 135 may be a module or a Windows system service, and may be implemented as executable software code (e.g., Proxy.exe). In another aspect, proxy 135 may be a module that performs a function or operation on behalf of another module—such as client remote access module 130, client multimedia application 120, or one or more decoders of client multimedia application 120—and communicates with agent 170 or server remote access module 175 on server 180 or may be a module that performs a task in the background. In yet another aspect, proxy 135 may a module that performs other functions or operations.

Agent 170 on server 180 may be configured to register with server multimedia application 190 as the decoder(s) (including codecs) and the file/stream loader (e.g., a program responsible for accessing and/or loading a file or stream) for various types of multimedia content, thereby replacing any previously registered server decoder(s) and server file/stream loader(s). According to one aspect of the disclosure, agent 170 can also register with the operating system of server 180. As a result, when server multimedia application 190 seeks to decode and/or load encoded multimedia content 185, server multimedia application 190 calls agent 170 to decode and/or load encoded multimedia content 185. When called by server multimedia application 190, agent 170 is configured to call the previously replaced server decoder(s) and the server file/stream loader to decode and/or load encoded multimedia file 185. According to one aspect of the disclosure, agent 170 is also configured to call server encoder(s) to encode decoded multimedia content. In certain embodiments, agent 170 on server 180 may be configured to register with server multimedia application 190 as a media splitter.

Agent 170 may be also configured to send decode requests for encoded multimedia content, including decode requests for portions of encoded multimedia content. According to one aspect of the disclosure, a decode request for encoded multimedia content is a request to determine if a multimedia application has access to the encoded multimedia content and the decoder(s) necessary to decode the encoded multimedia content. Agent 170 is further configured to send encoded multimedia content, including portions of encoded multimedia content, to a remote system.

Agent 170 may be further configured to send event commands to control the playback of the multimedia content, and to provide notification of the status of playback of encoded multimedia content on a remote system, such as client 110. Agent 170 may be also configured to load a rendering screen on the display of server 180. Agent 170 may then generate a color key corresponding to the color key.

In one aspect of the disclosure, agent 170 may be a module or a Windows system service, and may be implemented as executable software code (e.g., Agent.exe). In another aspect, agent 170 may be a module that performs a function or operation on behalf of another module—such as a server operating system, a software application, or a driver on the server—and communicates with client 110, while not disclosing the details of the function or operation to client 110, or may be a module that performs a task in the background. In yet another aspect, agent 170 may be a module that performs other functions or operations. In certain embodiments, agent 170 includes a service acting on the server 180 configured to run multiple instances of multimedia content, and also configured to act as a feeder to and receiver from the proxy 135 over the virtual channel 145.

According to one aspect of the disclosure, client multimedia application 120 is provided with a compression rate and audio and video quality optimized for playback on client 110 because of the negotiated delivery of encoded multimedia content 185. Because the logic for agent 170 through a negotiation with proxy 135 determines whether client multimedia application 120 has access to and can decode encoded multimedia content 185, encoded multimedia content 185 requested from server 180 is provided to and played by client multimedia application 120 according to the configuration of client 110. According to one aspect of the disclosure, the bandwidth load for remote access connection 140 between client 110 and server 180 is reduced because server 180 reduces the amount of unnecessary information sent to client 110 for encoded multimedia content 185 to be accessed and decoded. For example, if client multimedia application 120 has access to and can decode encoded multimedia content 185, client multimedia application 120 retrieves and decodes encoded multimedia content 185 directly, and agent 170 does not unnecessarily consume bandwidth of remote access connection 140 to send client 110 encoded multimedia content 185 to which client multimedia application 120 already has access.

In situations where client 110 can decode certain portions of encoded multimedia content 185 and not others, agent 170 sends appropriately encoded portions of encoded multimedia content 185 according to different encoding compression sizes, such as by streaming portions of the encoded multimedia content 185, so that client 110 can decode all portions of encoded multimedia content 185, while minimizing bandwidth usage. This reduces the delay in playing multimedia on the client-side caused by systems where a client needs to download an entire copy of encoded multimedia content from a server before being able to play the encoded multimedia content.

By shifting the responsibility for decompressing, decoding, playing, and other processing of encoded multimedia content from server 180 to client 110, scalability is improved for situations where a plurality of clients (e.g., client 110) are connected to server 180 seeking to access the same encoded multimedia content, and the corresponding load on server 180, including the load of processing and communicating, is thereby reduced. The communication of information between proxy 135 and agent 170 further allows for improved synchronization of multimedia included in the encoded multimedia content, for example, by improving the synchronization between audio and video portions of encoded multimedia content 185.

Figure 2:
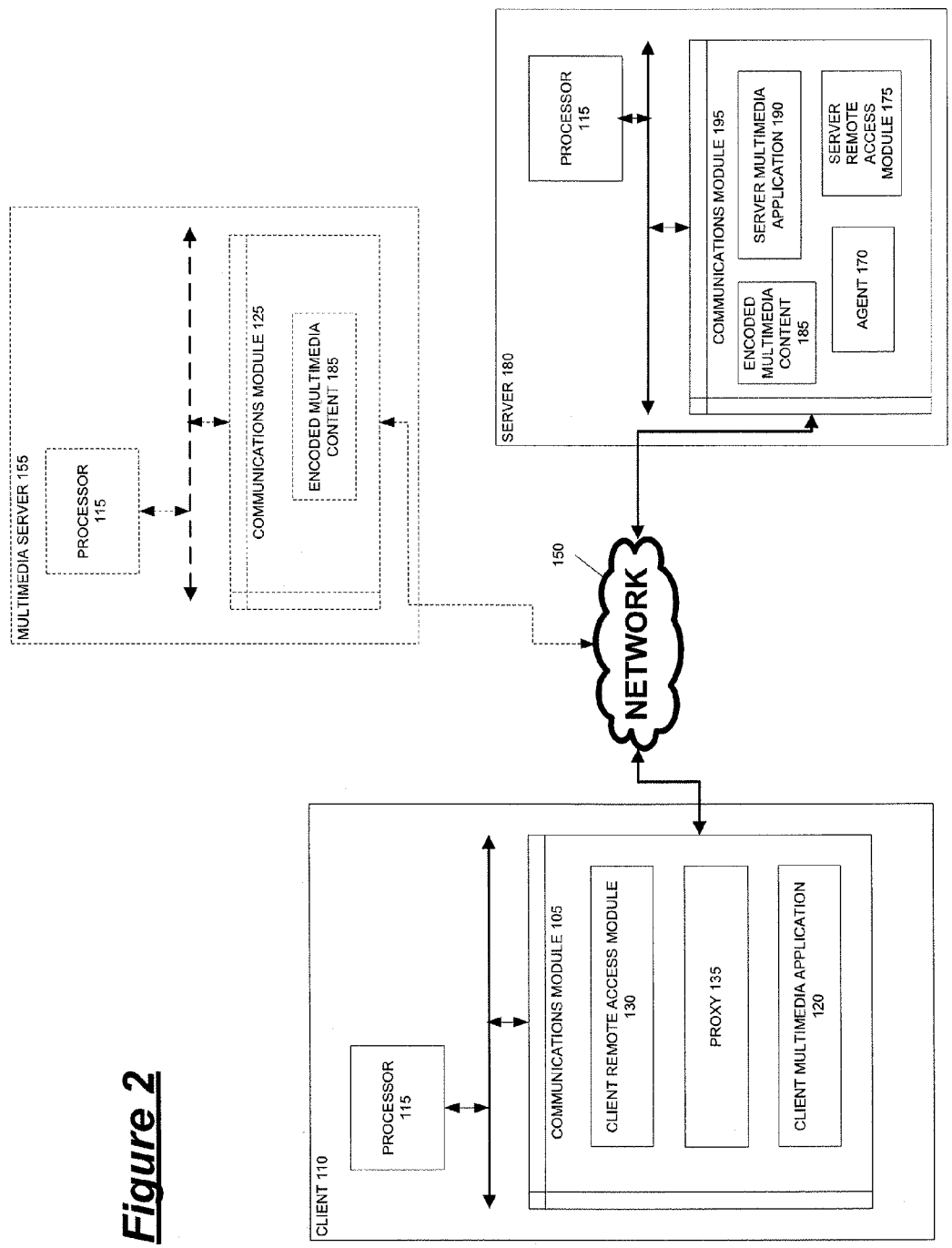
FIG. 2 is a block diagram illustrating an exemplary hardware configuration of a multimedia redirection system.

Now referring to FIG. 2, a conceptual block diagram is shown illustrating an exemplary hardware configuration for the multimedia redirection system of FIG. 1. A multimedia redirection system may include one or more clients and one or more servers. A server may include one or more encoded multimedia files. Although encoded multimedia content 185 is illustrated as available through communications module 195 of server 180, encoded multimedia content may alternatively be available through communications module 125 of multimedia server 155, as denoted by the dotted illustration of multimedia server 155 and its constituent parts. In either of these cases, agent 170 has access to encoded multimedia content 185. In certain embodiments, encoded multimedia content 185 can be accessed directly by the client multimedia application 120, such as without the need of proxy 135 accessing the encoded multimedia content 185.

Clients 110 can represent a computer, a laptop computer, a thin client, a PDA, a portable computing device, an MID, or a suitable device with a processor. According to one aspect of the disclosure, when a client is a thin client, it may be a device having at least a processor and memory, where the total amount of memory of the thin client is less than the total amount of memory in server 180. In one example, a thin client may not have a hard disk. In certain configurations, client 110 can represent a mobile telephone, an audio player, a game console, a camera, a camcorder, an audio device, a video device, a multimedia device, or a device capable of supporting a connection to remote server 180. Client 110 can be stationary or mobile.

Server 180 and multimedia server 155 may represent a computer, a laptop computer, a thin client, a PDA, a portable computing device, a virtual machine (e.g. VMware® Virtual Machine), or a suitable device with a processor. In certain configurations, server 180 and multimedia server 155 can represent a mobile telephone, an audio player, a game console, a camera, a camcorder, an audio device, a video device, a multimedia device, or another suitable device. Server 180 and multimedia server 155 can be stationary or mobile.

A processor such as processor 115, illustrated as part of client 110, server 180, and multimedia server 155, may be implemented using software, hardware, or a combination of both. The processors 115 for the client 110, server 180, and multimedia server 155 can be of varying types. By way of example and not limitation, a processor may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or any other suitable device that can perform calculations or other manipulations of information. A processor may also include one or more machine-readable media for storing software. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media may include storage integrated into a processor, such as might be the case with an ASIC. Machine-readable media may also include storage external to a processor, such as a random access memory (RAM), a flash memory, a read only memory (ROM), a programmable read-only memory (PROM), an erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for a processor. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by client 110, by server 180, by multimedia server 155, or by processor 115. Instructions can be, for example, a computer program including code. A machine-readable medium may comprise one or more media.

Communications modules 105, 125, and 195, illustrated as part of client 110, multimedia server 155, and server 180, may be implemented using software, hardware, or a combination of both. By way of example, communications modules 105, 125, and 195 may be implemented with one or communications devices, such as, but not limited to, a modem, RS-232, Ethernet, Wi-Fi, IEEE 802.11x, or other forms of communication.

Communications modules 105, 125, and 195 may also include one or more machine-readable media for storing software. Communications module 105 of client 110 includes previously described client remote access module 130, proxy 135, and client multimedia application 120, each of which may have direct access to its respective processor 115. Communications module 195 of server 180 includes previously described agent 170, server remote access module 175, and server multimedia application 190, each of which may have direct access to its respective processor 115, and encoded multimedia content 185. Communications module 125 of multimedia server 155 may include encoded multimedia content 185.

Each of communications modules 105, 125, and 195 is also configured for communicating with the other illustrated devices over network 150. According to one aspect of the disclosure, remote access connection 140, including virtual channel 145, may connect to network 150 using the same physical connection. Communications modules 105, 125, and 195 can be connected to network 150, for example, via a modem connection, a local-area network (LAN) connection including the Ethernet, or a broadband wide-area network (WAN) connection including digital subscriber line (DSL), Cable, T1, T3, Fiber Optics, and Satellite connection. Network 150 can be a LAN network, a corporate WAN network, or the Internet, and may include features such as a firewall.

Communications modules 105, 125, and 195 may be configured to communicate information for their respective devices, client 110, multimedia server 155, and server 180. The functionality of the communications modules 105, 125, and 195 for one configuration of a multimedia redirection system is illustrated in FIG. 2, but those skilled in the art will readily appreciate that other configurations may include a communications module that has the same or different functionality.

FIG. 3 is a flow chart depicting an exemplary process of a preliminary stage in redirecting multimedia playback from a local computing device (e.g., server 180) to a remote computing device (e.g., client 110). According to one aspect of the disclosure, the exemplary process of FIG. 3 can be repeated serially, resulting in the simultaneous playback of multiple encoded multimedia files on the remote computing device. The instructions for this method may be embodied in a machine-readable medium according to one aspect of the present disclosure. The method may include some or all of the following steps.

The method starts on the server side. In step 301, agent 170 registers with server multimedia application 190 as decoder (s) and file/stream loader, replacing the server decoder(s) and server file/stream loader. Agent 170 can register with server multimedia application 190 when agent 170 is first installed in the operating system of server 180. According to another aspect of the disclosure, agent 170 can register with server multimedia application 190 when a remote access connection is made between client remote access module 130 and server remote access module 175.

On the client side, in step 302, client remote access module 130 sends a remote access connection request to server remote access module 175. Returning to the server side, in decision step 303, if the server remote access module confirms the remote access connection request, then the remote access connection 140 between client remote access module 130 and server remote access module 175 is complete and the method moves to the client side in step 304. The connection can be a physical or wired connection, or the connection can be wireless, as described above. If server remote access module 175 does not confirm the request (e.g., the connect request time out period expires, or server 180 does not have the resources to complete the remote access connection) in decision step 303, then the method proceeds to step 313. In certain embodiments, the server remote access module 175 is configured to confirm the request.

According to one aspect of the disclosure, proxy 135 can be loaded on client 110 when remote access connection 130 is established. On the client side, in step 304, client remote access module 130 opens virtual channel 145 on remote access connection 140. On the server side, in step 305, server multimedia application 190 receives a playback request to play encoded multimedia content 185. The playback request can originate from any number of sources, including, without limitation, a program running on the server operating system, a program running in the background of the server operating system, a command prompt, a program menu launch, an Internet browser, a multimedia application, by a user of client 110 over remote access connection 140, without user input, or other sources. For example, a multimedia file (or a web page containing a multimedia file) can be launched on the server by an application. According to one aspect of the disclosure, server multimedia application 190 is launched on server 180.

Next, in step 306, server multimedia application 190 calls agent 170 to access encoded multimedia content 185. Agent 170 may access encoded multimedia content 185 (and similarly provide encoded multimedia content 185 to client 110) using any number of protocols, including, without limitation, local access on server 180, Hypertext Text Transfer Protocol (HTTP), File Transfer Protocol (FTP), Real-Time Streaming Protocol (RTSP), Real-Time Protocol (RTP), and Microsoft Media Server (MMS), including the capability to provide multicast and unicast transmissions. In step 307, agent 170 attempts to send a decode request for the requested encoded multimedia content 185 through server remote access module 175 and over virtual channel 145 to client remote access module 130. If virtual channel 145 is available according to decision step 308, then agent 170 completes sending the decode request to client remote access module 130.

Moving to the client side, in step 310, client remote access module 130 sends the received decode request to proxy 135. In step 311, proxy 135 processes the decode request to determine if client multimedia application 120 has both access to encoded multimedia content 185 and the decoder(s) necessary to decode encoded multimedia content 185.

If it is determined in decision step 312 that client multimedia application 120 does have both access to encoded multimedia content 185 and the decoder(s) necessary to decode encoded multimedia content 185, then the process proceeds to step 401. According to one aspect of the disclosure, client multimedia application 120 is determined to have access to encoded multimedia content 185 if it can identify (or parse) the location of encoded multimedia content 185, and retrieve encoded multimedia content 185 from its location. If, however, it is determined in step 312 that client multimedia application 120 does not have both access to encoded multimedia content 185 and the decoder(s) necessary to decode encoded multimedia content 185, then the process moves to step 501.

Returning to step 308, if a virtual channel 145 is not available for agent 170 to send the decode request to client remote access module 130, then the process jumps to step 313. In step 313, agent 170 calls on the server's decoder(s) to decode encoded multimedia content 185, and after encoded multimedia content 185 is decoded by the server's decoders, agent 170 sends the decoded multimedia content to server multimedia application 190. Agent 170 then notifies server multimedia application 190 that encoded multimedia content 185 has been successfully opened. In step 314, server multimedia application 190 plays the decoded multimedia content.

Figure 4:
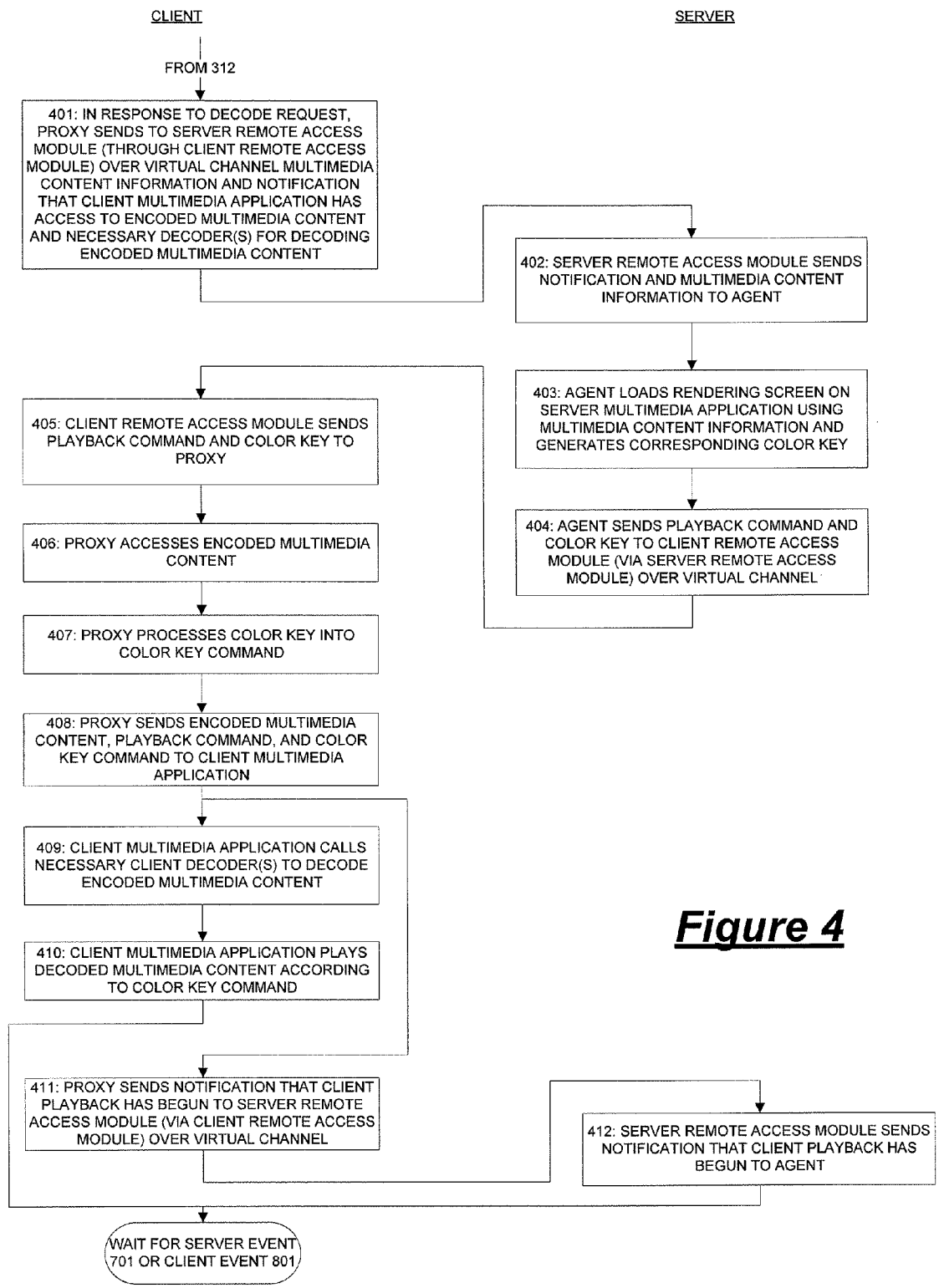
FIG. 4 is a flow chart depicting an exemplary process of a subsequent stage of FIG. 3, where a remote computing device has both access to encoded multimedia content and the decoders necessary to decode the encoded multimedia content.

FIG. 4 is a flow chart depicting an exemplary process of a subsequent stage of FIG. 3, where a remote computing device (e.g., client 110) has both access to encoded multimedia content (e.g., encoded multimedia content 185) and the decoder(s) necessary to decode the encoded multimedia content. According to one aspect of the disclosure, this process is known as "URL redirection," in that the location (e.g., universal resource locator or "URL", or another type of file locator) of the encoded multimedia content, or the location of a document containing the encoded multimedia content, is available and accessible to the remote computing device. According to one aspect of the disclosure, the remote computing device is thus responsible for creating the complete playback pipeline of the encoded multimedia content.

In step 401, which follows decision step 312 of FIG. 3 in which it was determined that client multimedia application 120 has both access to encoded multimedia content 185 and the decoder(s) necessary to decode multimedia content 185, proxy 135 sends to server remote access module 175 through client remote access module 130 and over virtual channel 145 multimedia content information and a notification that client multimedia application 120 has access to encoded multimedia content 185 and the decoder(s) necessary for decoding encoded multimedia content 185. Turning to the server side, in step 402, server remote access module 175 sends the notification and the multimedia content information to agent 170. In step 403, agent 170 both loads a rendering screen on server multimedia application 190 using the multimedia content information and also generates a corresponding color key. For example, if encoded multimedia content 185 includes video playback, agent 170 loads a rendering screen on the server display at the same position and of the same size as where the video will be played back on the client display. In step 404, agent 170 sends a playback command, configured to command client multimedia application 120 to begin playback of encoded multimedia content 185, and the color key to client remote access module 130 via the server remote access module 175 and over virtual channel 145.

Returning to the client side, in step 405, client remote access module 130 sends the playback command and the color key to proxy 135. In step 406, proxy 135 accesses encoded multimedia content 185, and in step 407, proxy 135 processes the color key into a color key command. In step 408, proxy 135 sends encoded multimedia content 185, the playback command, and the color key command to client multimedia application 120. From step 408, two separate paths, a first path with steps 409-410 and a second path with steps 411-412, are followed in parallel. In certain other aspects of the disclosure, the two paths may be followed serially.

In step 409, client multimedia application 120 calls on the necessary client decoder(s) to decode encoded multimedia content 185. In step 410, client multimedia application 120 plays the decoded multimedia content according to the color key command. For example, using the same example discussed above with reference to step 403, a video multimedia content is played on the client display in the same position and in the same size window as the rendering screen displayed on the server display. In certain embodiments, the proxy 135 and agent 170 are configured to use time stamps in order to compare and synchronize the playback of the encoded multimedia content 185. The process then proceeds to wait for a server event in step 701 or a client event in step 801.

In the second path proceeding from step 408, in step 411, proxy 135 sends a notification to server remote access module 175 via client remote access module 135 over virtual channel 145 that playback of encoded multimedia content 185 has begun on client multimedia application 120. Returning to the server side, in step 412, server remote access module 175 sends the notification to agent 170.

Figure 5A:
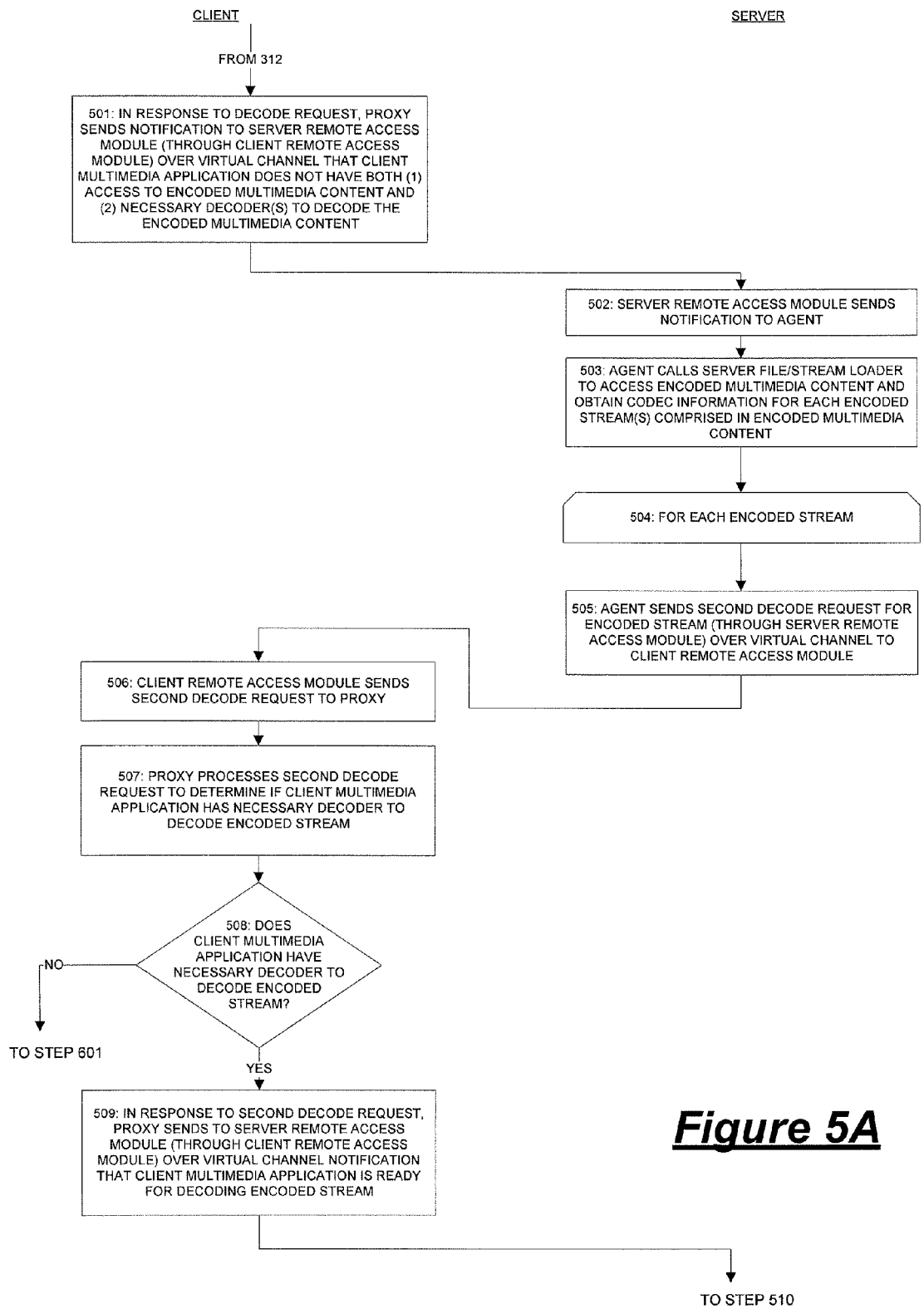
FIGS. 5A and 5B are flow charts depicting an exemplary process of a subsequent stage of FIG. 3, where a remote computing device does not have both access to encoded multimedia content and the decoders necessary to decode the encoded multimedia file.
Figure 5B:
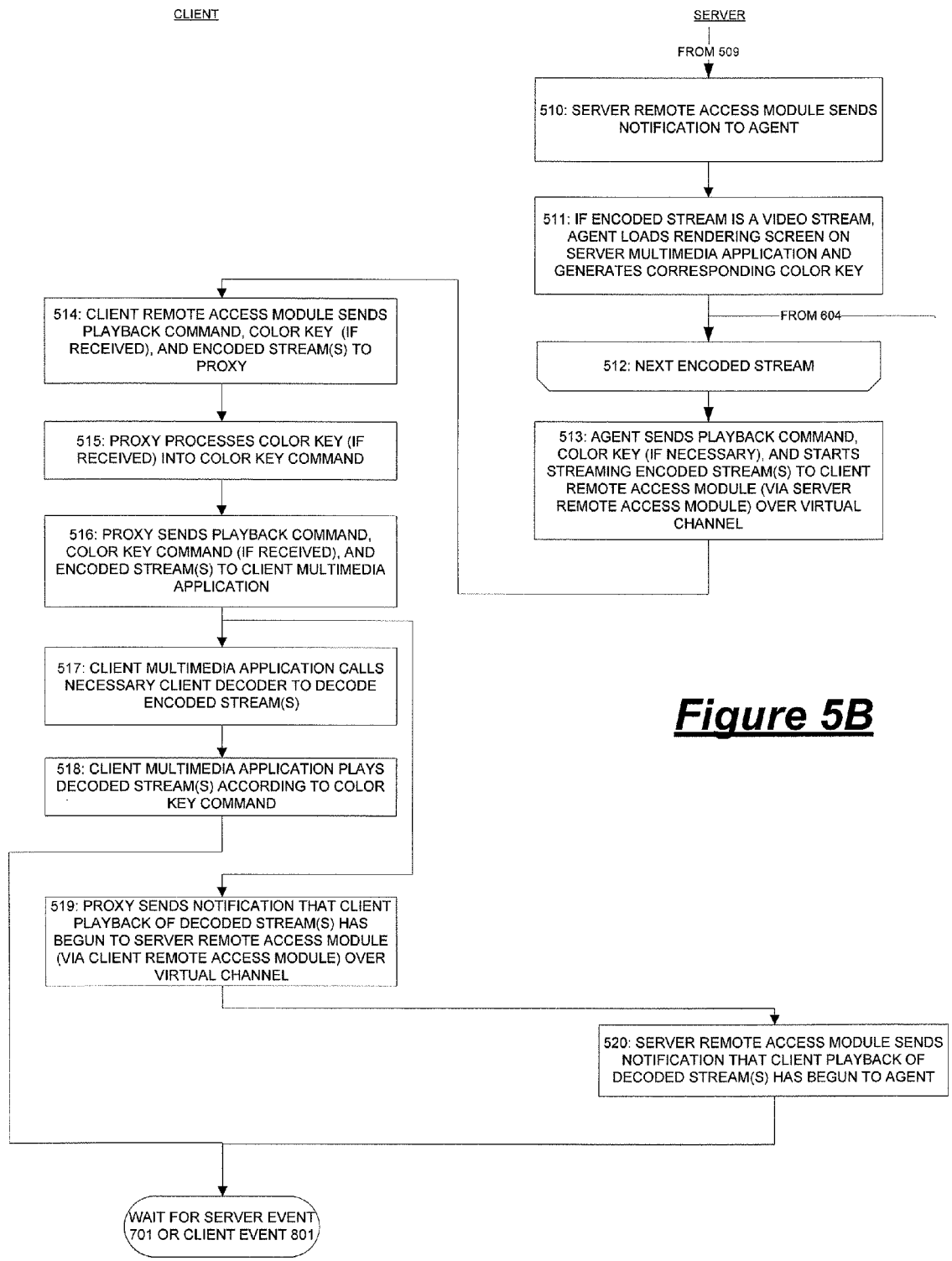

FIGS. 5A and 5B are flow charts depicting an exemplary process of a subsequent stage of FIG. 3, where a remote computing device (e.g., client 110) does not have both access to encoded multimedia content (e.g., encoded multimedia content 185) and the decoders necessary to decode the encoded multimedia content.

Step 501 proceeds from step 312 of FIG. 3 in which it was determined that client multimedia application 120 does not have both access to encoded multimedia content 185 and the decoder(s) necessary to decode encoded multimedia content 185. In step 501, proxy 135 sends a notification to server remote access module 175 via client remote access module 130 over virtual channel 145 that client multimedia application 120 does not have both access to encoded multimedia content 185 and the decoder(s) necessary to decode encoded multimedia content 185. Turning to the server side, in step 502, server remote access module 175 sends the notification to agent 170. In step 503, agent 170 calls the server file/stream loader to access encoded multimedia content 185 and obtain codec (i.e., encoding) information for each encoded stream comprising encoded multimedia content 185. According to one aspect of the disclosure, codec information includes the type of encoding used to encode at least a portion of multimedia content, for example, the encoding format used to encode a stream comprising encoded multimedia content 185.

Step 504 begins a sequence of steps that loops for each encoded stream of encoded multimedia content 185. In the first step of the sequence, step 505, agent 170 sends a second decode request for an encoded stream of encoded multimedia content 185 through server remote access module 175 over virtual channel 145 to client remote access module 130. Moving to the client side, in step 506, client remote access module 130 sends the second decode request to proxy 135. In step 507, proxy 135 processes the second decode request to determine if the client multimedia application 120 has the necessary decoder to decode the encoded stream whose encoding information was included in the second decode request. In decision state 508, client multimedia application 120 is assessed to determine if it has the necessary decoder to decode the encoded stream. If client multimedia application 120 does not have the necessary decoder to decode the encoded stream, the process moves to step 601 (in FIG. 6). If, however, client multimedia application 120 is determined to have the necessary decoder to decode the encoded stream, the process moves to step 509.

In step 509, proxy 135 sends to server remote access module 175 through client remote access module 130 and over virtual channel 145 a notification that client multimedia application 120 is ready for decoding the encoded stream. According to one aspect of the disclosure, the process of steps 509-512 is known as "rendering redirection" or "transcoding," in that a remote computing device (e.g., client 110) decodes and renders encoded multimedia content (e.g., encoded multimedia content 185). In step 510 (in FIG. 5B), on the server side, server remote access module 175 sends the notification to agent 170. In step 511, if the encoded stream is a video stream, agent 170 loads a rendering screen on server multimedia application 190 and generates a corresponding color key. The sequence of steps 505-511 is repeated for any remaining encoded stream comprising encoded multimedia content 185 by returning to step 504 which began the loop, as indicated by the end of loop step 512.

In step 513, agent 170 sends a playback command, a color key (if necessary), and starts streaming the encoded stream(s) of steps 504-512 to client remote access module 130 via server remote access module 175 over virtual channel 145. Turning to the client side, in step 514, client remote access module 130 sends the playback command, the color key (if received), and the encoded stream(s) to proxy 135. In step 515, proxy 135 processes the color key (if received) into a color key command. In step 516, proxy 135 sends the playback command, the color key command, if received, and the encoded stream(s) to client multimedia application 120. Step 516, two separate paths are followed in parallel, a first path comprising steps 517-518 and a second path comprising steps 519-520. According to another aspect of the disclosure, the two separate paths may be followed serially.

In step 517, client multimedia application 120 calls the necessary client decoder(s) to decode the encoded stream(s). In step 518, client multimedia application 120 displays the decoded stream(s) according to the color key command. The process then waits for a server event in step 701 or a client event in step 801.

In step 519, which begins the second path from step 516, proxy 135 sends a notification that client playback of the decoded stream(s) has begun on client multimedia application 120 to server remote access module 175 via client remote access module 130 over virtual channel 145. Returning to the server side, in step 520, server remote access module 175 sends the notification to agent 170. The process then proceeds to wait for server event 701 or client event 801.

Figure 6:
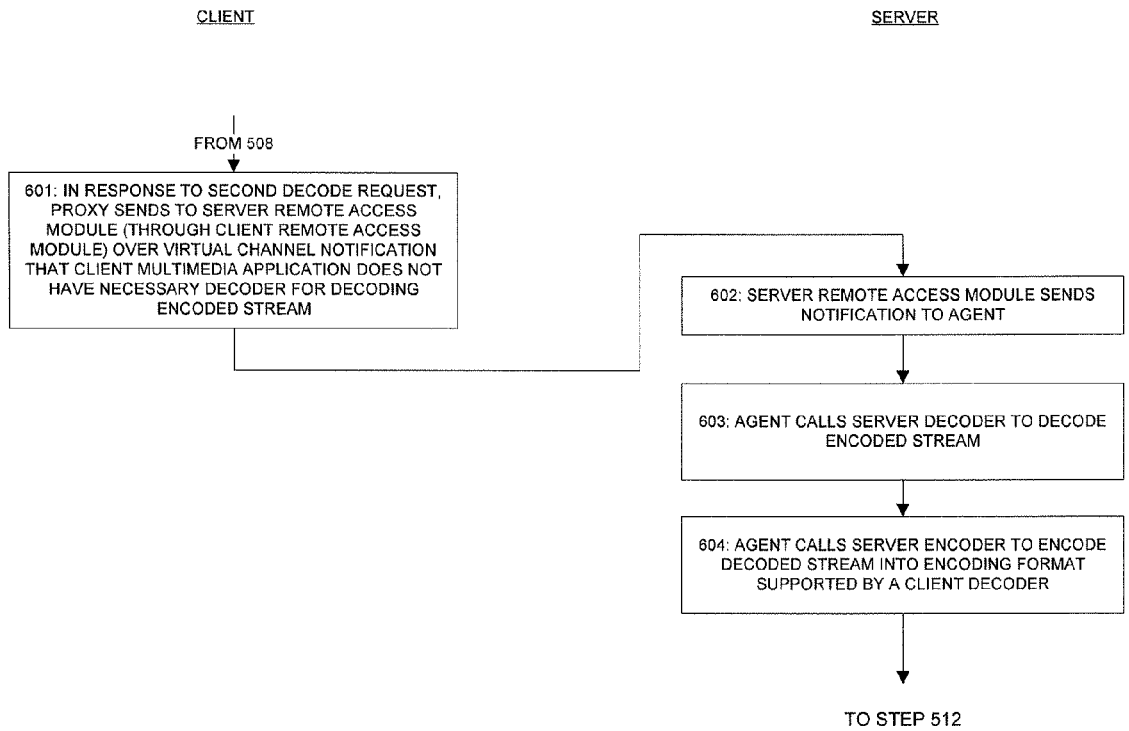
FIG. 6 is a flow chart depicting an exemplary process of a subsequent stage of FIGS. 3 and 5A, where a remote computing device does not have a decoder necessary to decode an encoded stream of multimedia content.

FIG. 6 is a flow chart depicting an exemplary process of a subsequent stage of FIGS. 3 and 5A, where a remote computing device (e.g., client 110) does not have a necessary decoder to decode an encoded stream of multimedia content (e.g., encoded multimedia content 185). According to one aspect of the disclosure, this process is known as "decoder redirection," in that a local computing device (e.g., server 180) first decodes the multimedia content before providing it to the remote computing device.

Step 601 proceeds from step 508 of FIG. 5A, in which it was determined that client multimedia application 120 does not have the necessary decoder to decode the encoded stream. In step 601, proxy 135 sends to server remote access module 175 through client remote access module 130 over virtual channel 145 a notification that client multimedia application 120 does not have the necessary decoder for decoding the encoded stream. Moving to the server side, in step 602, server remote access module 175 sends the notification to agent 170. In step 603, agent 170 calls the server decoder to decode the encoded stream. In step 604, agent 170 calls a server encoder to encode the decoded stream into an encoding format supporting by a decoder available to client multimedia application 120, such as, for example, using a less process intensive encoding and decoding algorithm. The capability of agent 170 to cause decoding from a first encoding format and subsequent encoding into a second encoding format may be referred to as "transcoding."

According to one aspect of the disclosure, in step 604, an encoding format may be used that is universal to all systems for decoding multimedia content, such as the pulse code modulation (PCM) format, motion JPEG format, red, green, blue (RGB) format, or YUV format. According to another aspect of the disclosure, in order to assist agent 170 in determining which encoding format to use, information on decoding capabilities available to client multimedia application 120 may be sent in response to the second decode request in 601 along with the notification that client multimedia application 120 did not have the necessary decoder to decode the encoded stream. The encoding format is not limited to any type, and can be extended to any type of video, audio, image, or other compression format available. According to yet another aspect of the disclosure, step 604 may be skipped, and the method may proceed by sending a non-encoded and uncompressed stream(s) to client remote access module 130 in step 513, if the remote access connection would not be burdened by the greater network load of the data transfer. After step 604, the process proceeds to step 512, discussed above.

Figure 7:
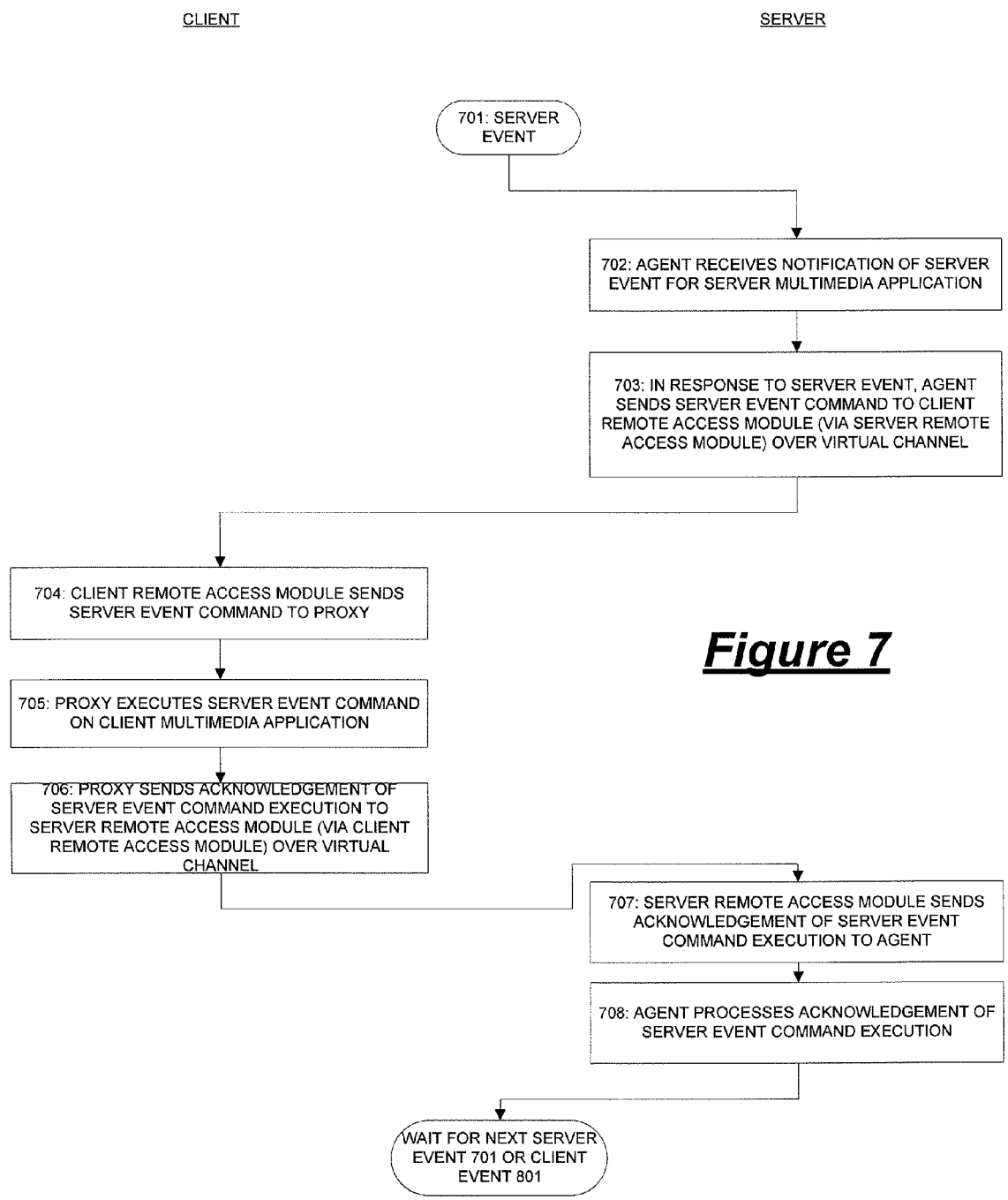
FIG. 7 is a flow chart depicting an exemplary process of a server event.

FIG. 7 is a flow chart depicting an exemplary process of a server (e.g., server 180) event. When a server event for server multimedia application 190 occurs in step 701, the method proceeds to step 702, where agent 170 receives notification of the server event. In step 703, in response to the server event, agent 170 sends a server event command to client remote access module 130 via server remote access module 175 over virtual channel 145. Turning to the client side, in step 704, client remote access module 130 sends the server event command to proxy 135. In step 705, proxy 135 executes the server command on client multimedia application 120. In step 706, proxy 135 sends acknowledgement of the server event command execution to server remote access module 175 via client remote access module 130 over virtual channel 145. Returning to the server side, in step 707, server remote access module 175 sends the acknowledgement of the server event command execution to agent 170. In step 708, agent 170 processes the acknowledgement of the server event command execution. The method then proceeds to wait for the next server event in step 701 or the next client event in step 801.

Figure 8:
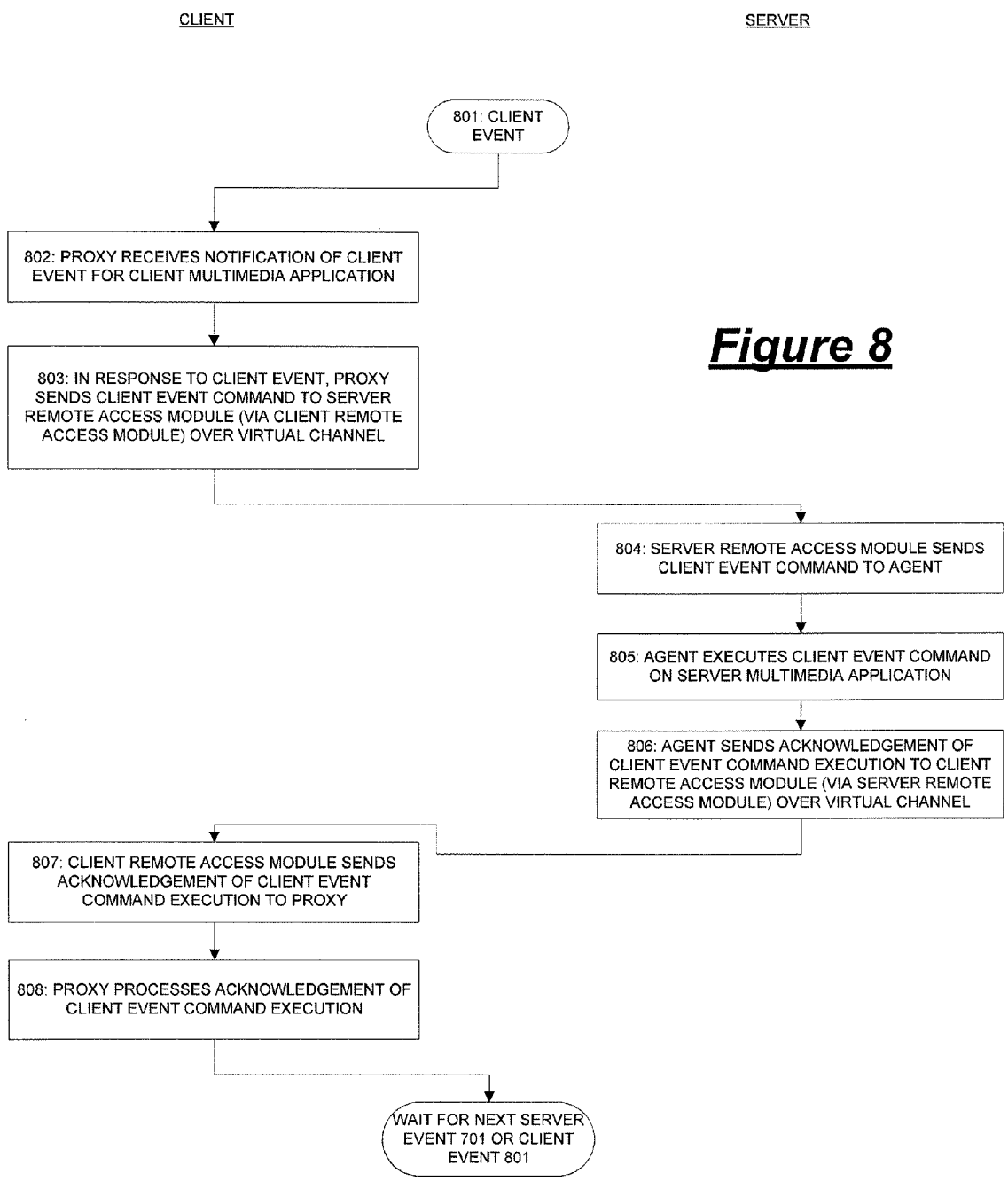
FIG. 8 is a flow chart depicting an exemplary process of a client event.

FIG. 8 is a flow chart depicting an exemplary process of a client (e.g., client 110) event. When a client event for client multimedia application 120 occurs in step 801, the method to proceed to step 802, in which proxy 135 receives notification of the client event for client multimedia application 120. In step 803, in response to the client event, proxy 135 sends a client event command to server remote access module 175 via client remote access module 130 over virtual channel 145. On the server side, in step 804, server remote access module 175 sends the client event command to agent 170. In step 805, agent 170 executes the client event command on server multimedia application 190. In step 806, agent 170 sends acknowledgement of the client event command execution to client remote access module 130 via server remote access module 175 over virtual channel 145. In step 807, on the client side, client remote access module 130 sends the acknowledgement of the client event command execution to proxy 135. In step 808, proxy 135 processes the acknowledgment of the client event command execution. The method then proceeds to wait for the next server event in step 701 or the next client event in step 801.

In one aspect of the disclosure, many of the steps described in FIGS. 3-8 above may be performed automatically without the intervention of a user of client 110 and/or the intervention of a user of server 180.

Figure 9:
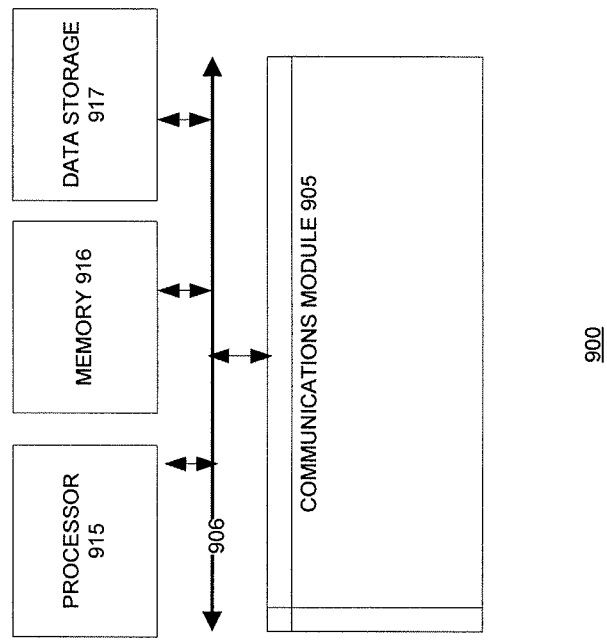
FIG. 9 is a block diagram that illustrates an exemplary computing system that can perform certain aspects of the present disclosure in accordance with one configuration of the present disclosure.

FIG. 9 is a block diagram that illustrates an exemplary computing system that can perform certain aspects of the present disclosure in accordance with one configuration of the present disclosure. Computing system 900 may represent any one or more of client 110, multimedia server 155, and server 180. Computing system 900 may include communications module 905 for communicating information, bus 906 for communicating information between different modules, and processor 915 coupled with the communications module 905 for processing information. Communications module 905 may represent communications module 105, 125 or 195 (see FIG. 2). In certain embodiments, communications module 905 can include video graphics hardware for providing overlay support (e.g., to facilitate or otherwise optimize the use of the colorkey, as described above). In certain embodiments, a machine-readable comprises communications module 905. Processor 915 may represent processor 115 (see FIG. 2).

Computing system may 900 further include memory 916, such as a RAM, a ROM or other memory device, coupled to bus 906, for storing information and instructions to be executed by processor 915. Memory 916 may also be used for storing temporary variable or other intermediate information during execution of instructions to be executed by processor 915. Computing system 900 may further include data storage device 917, such as a magnetic disk or optical disk, coupled to bus 906 for storing information and instructions. According to one aspect of the disclosure, data storage device 917 can store encoded multimedia content 185. The operating system(s) as discussed herein, may reside wholly or in part, in memory 916 and/or data storage 917, and may be executed by processor 915. In certain embodiments, a machine-readable medium can be memory 916 and/or data storage device 917.

Now referring back to FIGS. 1 and 2, exemplary operating systems that are compatible with a multimedia redirection system include, but are not limited to, various versions and flavors of Windows Vista®, Windows XP®, Windows 2000 Server®, Windows Server 2003®, Windows NT®, Windows Me®, Windows 98®, Windows CE®, Windows XPe®, PocketPC®, Unix® systems, Wyse Thin Operating System (OS), and Linux®.

According to one configuration, server 180 and multimedia server 155 may utilize, for example, any one of the following operating systems: a version of Windows XP® (including Windows XPe with SP2 and Windows XP Professional with SP2), Windows Server 2003® (including Windows Server 2003® Standard Edition with SP1), or any other operating system. Server 180 and multimedia server 155 may run any one of the following: Microsoft® Terminal Services, Citrix® Presentation server, or Windows XP®.

According to one configuration, client 110 may utilize, for example, any one of the following operating systems: a version of Wyse Thin OS, Linux®, Windows CE® (including Windows CE® 5.0 and Windows CEO 6.0), Windows XP®, Windows XPe®, or any other operating system. Client 110 may use different classes of thin computing platforms, such as platforms that differ in their levels of scalability, flexibility, and expense.

Both proxy 135 and agent 170 can be configured to be installed on their respective systems, client 110 and server 180, using an installation package, such as an "install shield" package commonly known in the art. According to another aspect of the disclosure, either proxy 135 or agent 170 can be configured to be installed on their respective systems as part of the operating system image that comes pre-configured with a system, or as a Windows Driver Module package for a Microsoft® Windows operating system. According to yet another aspect of the disclosure, either proxy 135 or agent 170 can be configured to be installed on their respective systems after determining a remote access application is already installed and/or functioning on the respective systems. According to a further aspect of the disclosure, if proxy 135 is not installed on a client system, agent 170 will not redirect multimedia playback to the client system.

According to one aspect of the disclosure, server multimedia application 190 may automatically attempt to locate and load an appropriate decoder based on the type of encoding used to encode encoded multimedia content 185, such as by searching the Internet through network 150. Similarly, other components, such as encoded multimedia content 185, client remote access module 130, proxy 135, server remote access module 175, and agent 170, may already exist on their respective client and server systems, or they may be added to the systems at a later time.

Figure 10:
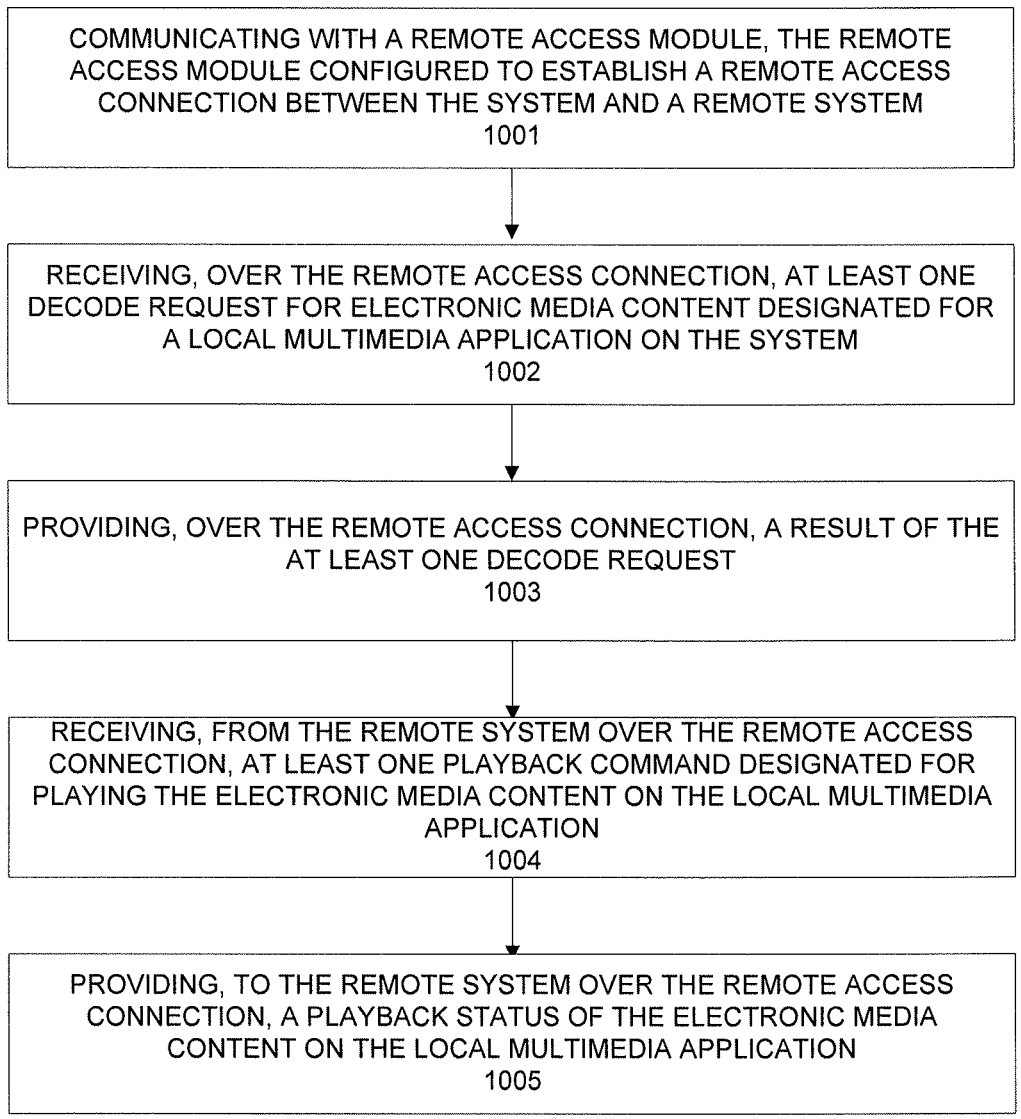
FIG. 10 is a flow chart illustrating an exemplary operation of playing back multimedia of a remote system.

FIG. 10 is a flow chart illustrating an exemplary operation of playing back multimedia of a remote system. A process at step 1001 includes communicating with a remote access module, the remote access module configured to establish a remote access connection between the system and a remote system. In step 1002, at least one decode request for electronic media content designated for a local multimedia application on the system is received over the remote access connection. In step 1003, a result of the at least one decode request is provided over the remote access connection. In step 1004, at least one playback command designated for playing the electronic media content on the local multimedia application is received from the remote system over the remote access connection. In step 1005, a playback status of the electronic media content on the local multimedia application is provided to the remote system over the remote access connection. The system is configured to allow the electronic media content to appear to be playing on a remote multimedia application on the remote system corresponding to the local multimedia application on the system, when the electronic media content is played on the local multimedia application.

Figure 11:
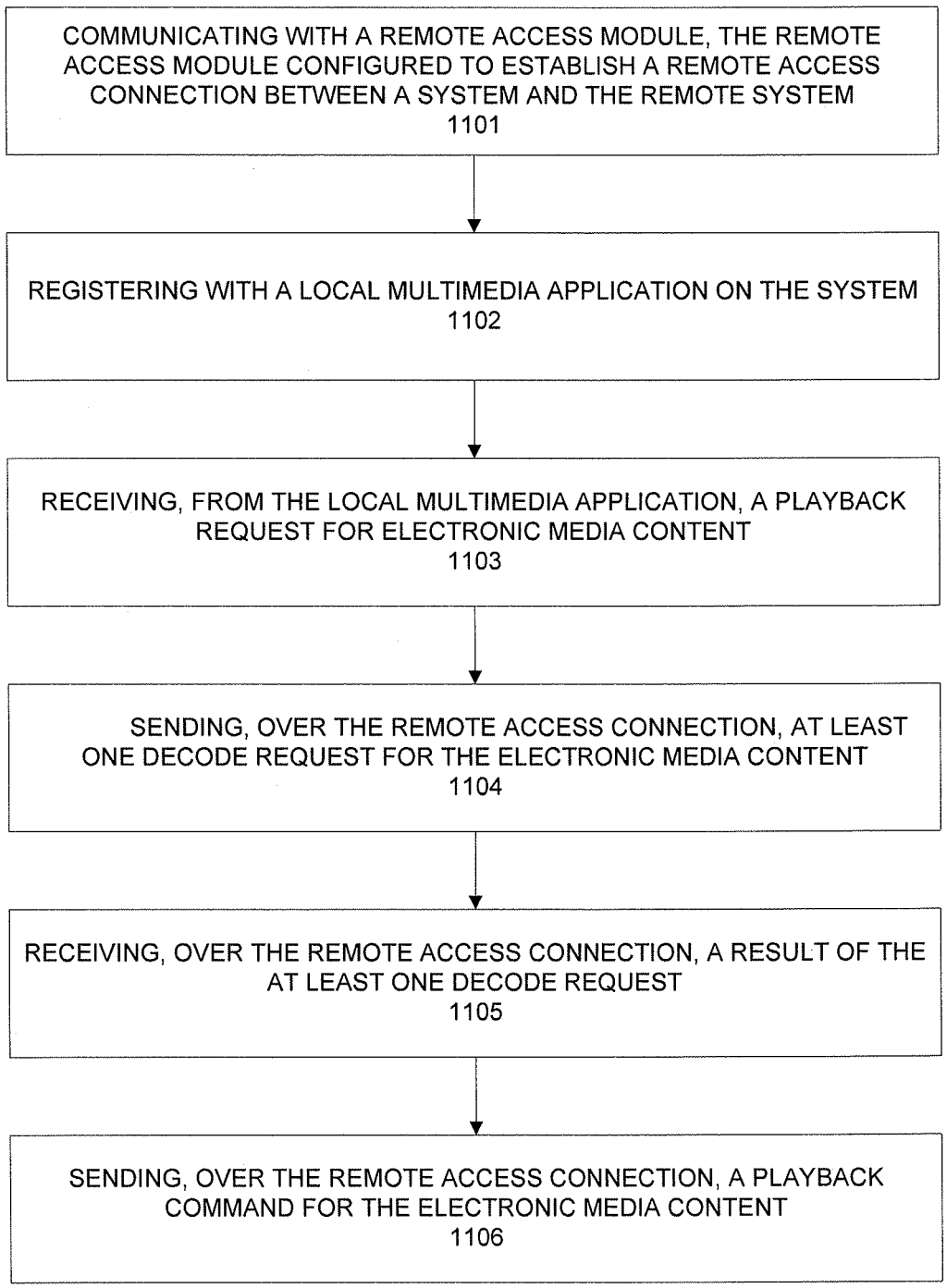
FIG. 11 is a flow chart illustrating an exemplary operation of redirecting playback of multimedia to a remote system.

FIG. 11 is a flow chart illustrating an exemplary operation of redirecting playback of multimedia to a remote system. A process at step 1101 includes communicating with a remote access module, the remote access module configured to establish a remote access connection between a system and the remote system. In step 1102, a local multimedia application is registered with the system. In step 1103, a playback request for an electronic media content is received from the local multimedia application. In step 1104, at least one decode request for the electronic media content is sent over the remote access connection. In step 1105, a result of at least one decode request is received over the remote access connection. In step 1106, a playback command for the electronic media content is sent over the remote access connection. The playback request for the electronic media content is designated for the system and the playback command for the electronic media content is designated for the remote system. The system is configured to have the electronic media content played on the remote system as a result of the playback command.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Figure 12:
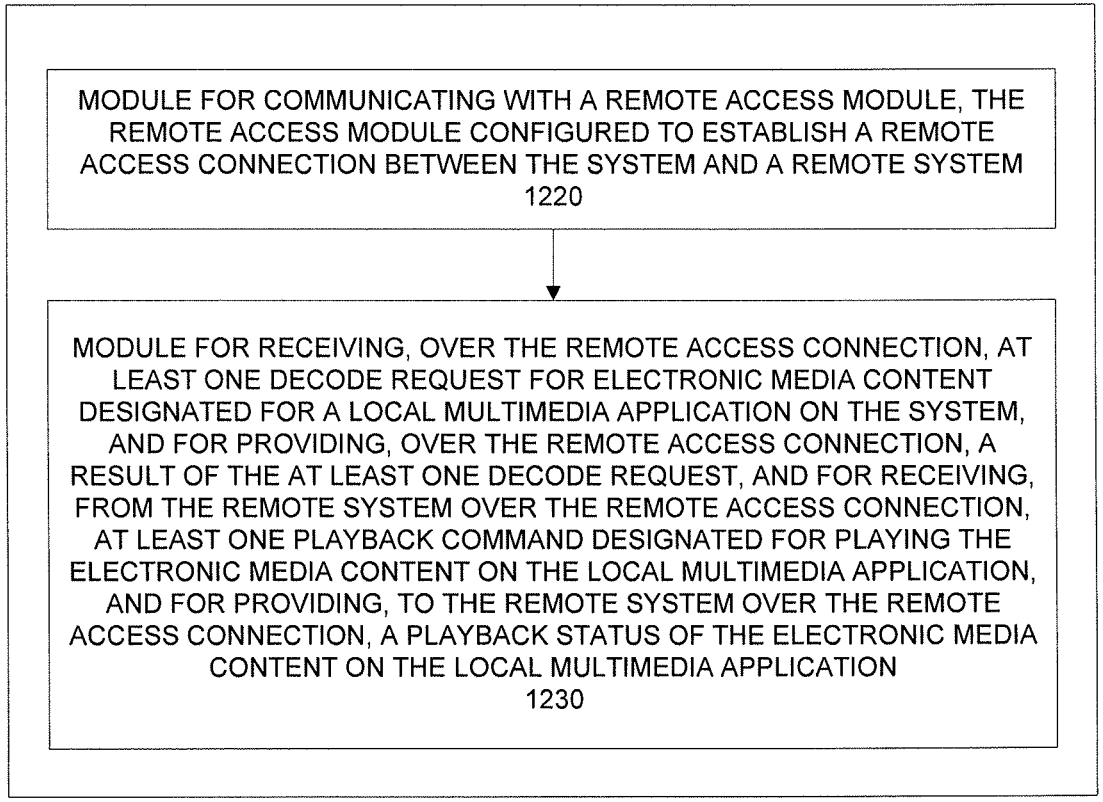
FIG. 12 is a conceptual block diagram illustrating an example of the functionality of modules in a system for playing back multimedia of a remote system.

FIG. 12 is a conceptual block diagram illustrating an example of the functionality of modules in a system 1210 (e.g., client 110) for playing back multimedia of a remote system. In this example, system 1210 includes a module 1220 for communicating with a remote access module, the remote access module configured to establish a remote access connection between the system and a remote system. System 1210 also includes a module 1230 for receiving, over the remote access connection, at least one decode request for electronic media content designated for a local multimedia application on the system, and for providing, over the remote access connection, a result of the at least one decode request, and for receiving, from the remote system over the remote access connection, at least one playback command designated for playing the electronic media content on the local multimedia application, and for providing, to the remote system over the remote access connection, a playback status of the electronic media content on the local multimedia application. System 1210 is configured to allow the electronic media content to appear to be playing on a remote multimedia application on the remote system corresponding to the local multimedia application on the system, when the electronic media content is played on the local multimedia application.

Figure 13:
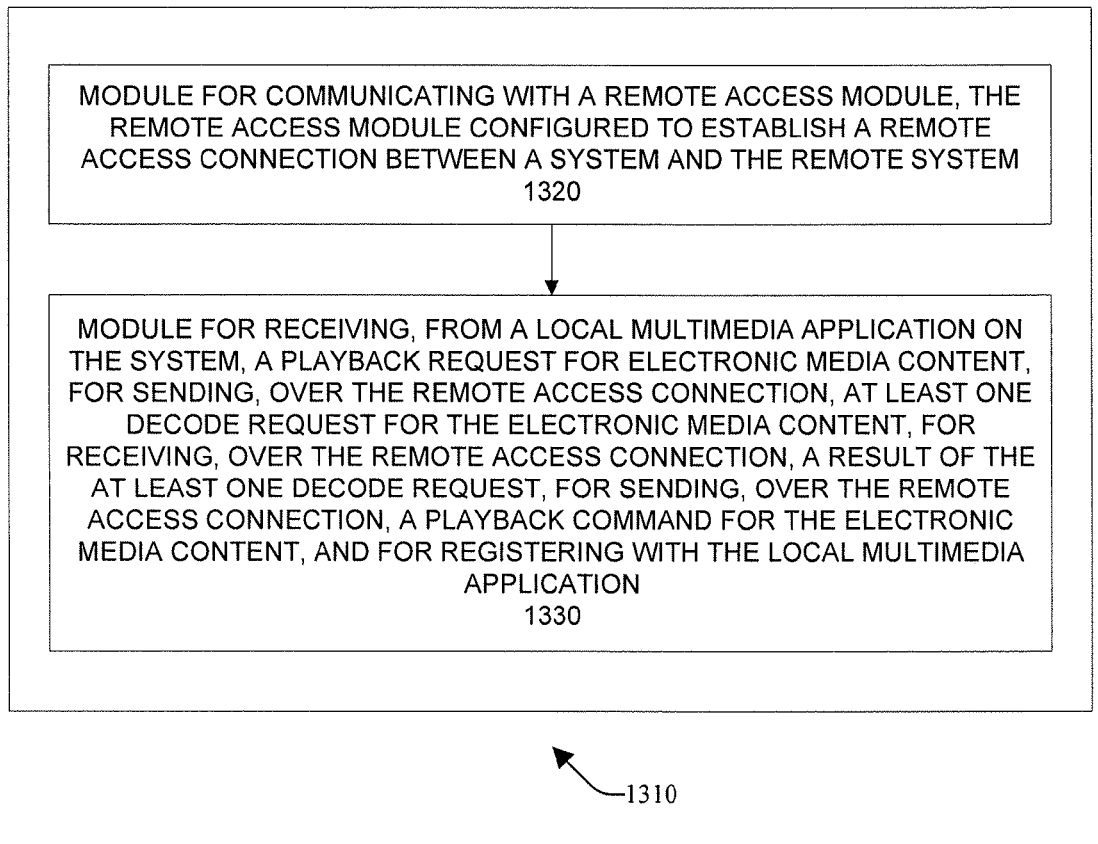
FIG. 13 is a conceptual block diagram illustrating an example of the functionality of modules in a system for redirecting multimedia.

FIG. 13 is a conceptual block diagram illustrating an example of the functionality of modules in a system 1310 (e.g., server 180) for redirecting multimedia. In this example, system 1310 includes a module 1320 for communicating with a remote access module, the remote access module configured to establish a remote access connection between a system and the remote system. System 1310 also includes a module 1330 for receiving, from a local multimedia application on the system, a playback request for electronic media content, for sending, over the remote access connection, at least one decode request for the electronic media content, for receiving, over the remote access connection, a result of the at least one decode request, for sending, over the remote access connection, a playback command for the electronic media content, and for registering with the local multimedia application. In system 1310, the playback request for the electronic media content is designated for the system and the playback command for the electronic media content is designated for the remote system. System 1310 is configured to have the electronic media content played on the remote system as a result of the playback command.

Figure 14:
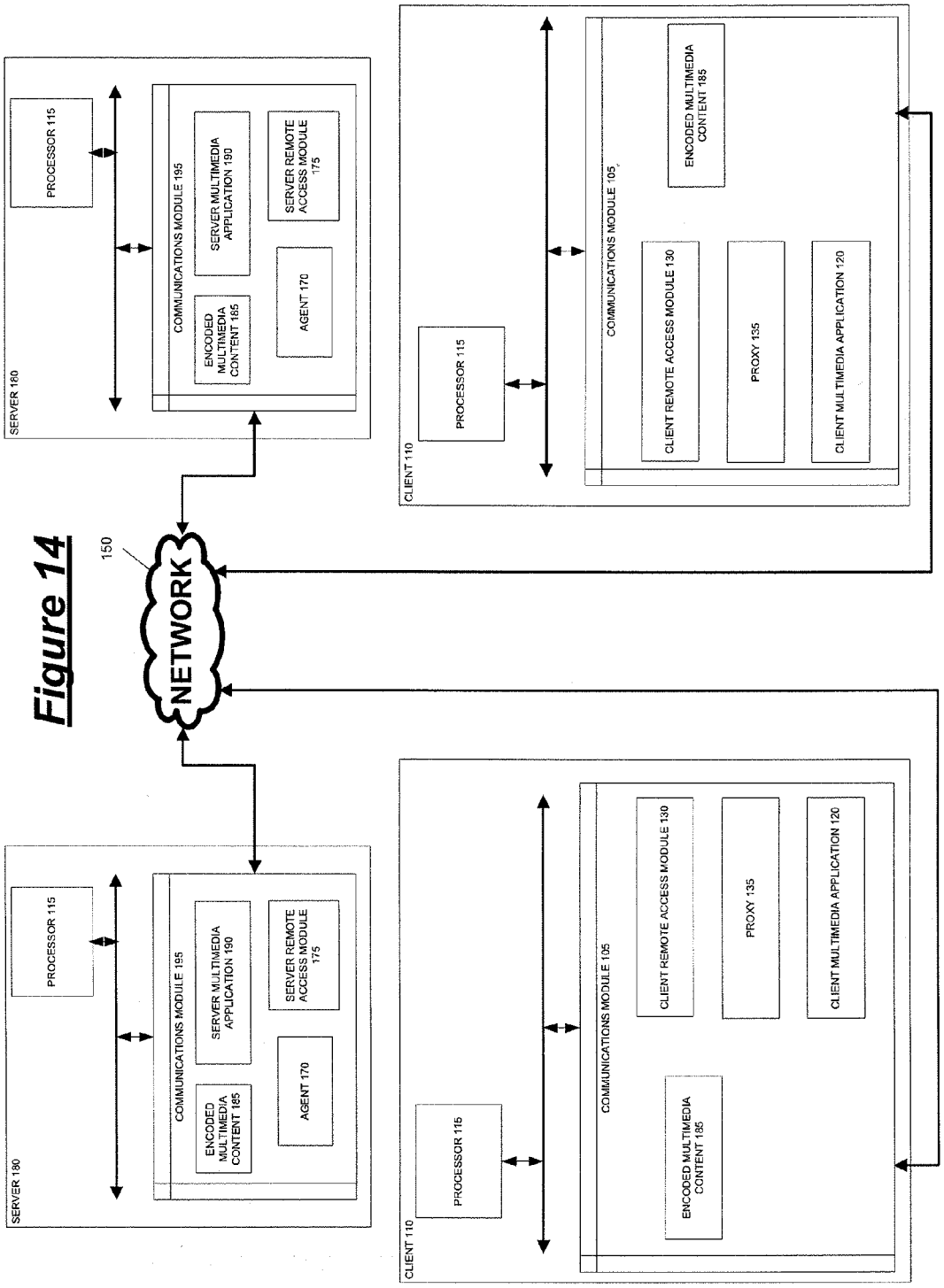
FIG. 14 is a block diagram illustrating an exemplary hardware configuration of a multimedia redirection system used for videoconferencing.

Now referring to FIG. 14, a conceptual block diagram is shown illustrating an exemplary hardware configuration for the multimedia redirection system of FIG. 1 that can be used for video-conferencing, e.g., the redirection of multimedia video-conferencing content. As discussed herein, video-conferencing includes the transfer of both audio content and video content that is time-stamped for synchronization. The configuration of FIG. 14 is advantageous in situations where a videoconference is held between two clients 110 that have a faster data connection (e.g., because they are geographically close to one another) than the data connection between at least one of the two client 110 and server 180 pairs (e.g., because the client 110 is geographically remote from the server 180).

In many aspects, the system of FIG. 14 is similar to the system of FIG. 2, except that another client 110 and server 180 pair replaces the multimedia server 155 of FIG. 2. Specifically, encoded multimedia content 185, such as, for example, video-conferencing multimedia content, is made available through the communications module 105 of each of the clients 110 over the network 150. Consequently, each client 110 can access the video-conferencing multimedia content 185 of the other client 110 directly.

By way of example, the process of FIG. 3 can be executed separately by the two client 110 and server 180 pairs illustrated in FIG. 14 in order to provide redirected multimedia video-conferencing content. In certain embodiments, the process may be executed substantially in parallel by the two client 110 and server 180 pairs. The exemplary disclosed videoconferencing process includes a situation in which each of the two clients 110 has access to and the necessary decoders for the encoded multimedia content 185 (e.g., the video-conference content) on the other client 110, although the methods described herein are applicable to situations in which each client 110 may not have such access or the appropriate decoders, as discussed above.

Now, referring back to FIG. 3, in step 301, agent 170 for each of the two servers 180 registers with its corresponding server multimedia application 190 as decoder(s) and file/stream loader, replacing the server decoder(s) and server file/stream loader. Agent 170 for each server 180 can register with its server multimedia application 190 when agent 170 is first installed in the operating system of its server 180.

For each of the two clients 110, on the client side, in step 302, client remote access module 130 sends a remote access connection request to each of the corresponding servers' 180 server remote access module 175. Returning to the server side, in step 303, each corresponding server remote access module 175 confirms the remote access connection request, and a remote access connection 140 for each client 110 and server 180 pair is complete, creating a connection between each client's 110 remote access module 130 and the corresponding server's 180 remote access module 175. If a server remote access module 175 does not confirm the request (e.g., the connect request time out period expires, or server 180 does not have the resources to complete the remote access connection), then the process ends. In certain embodiments, the server remote access module 175 is configured to confirm the request.

According to one aspect of the disclosure, proxy 135 can be loaded on each of the two clients 110 when a remote access connection 130 is established between each client 110 and server 180 pair. On the client side, in step 304, client remote access module 130 for each client 110 opens virtual channel 145 on remote access connection 140 to its corresponding server 180. On the server side, in step 305, server multimedia application 190 for each server 180, responsible for hosting the video-conference for that server, receives a playback request to play encoded multimedia content 185 (e.g., to begin the video-conference). The playback request can originate from any number of sources, including, without limitation, by a video-conferencing user of client 110 over remote access connection 140. For example, a videoconference can be launched on the server by the user of an application.

Next, in step 306, server multimedia application 190 of each server 180 calls its agent 170 to access encoded multimedia content 185. Agent 170 may access encoded multimedia content 185 from the other client 110 (and similarly provide encoded multimedia content 185 to the other client 110) using any number of protocols, including, without limitation, Hypertext Text Transfer Protocol (HTTP), File Transfer Protocol (FTP), Real-Time Streaming Protocol (RTSP), Real-Time Protocol (RTP), and Microsoft Media Server (MMS), including the capability to provide multicast and unicast transmissions. In steps 307-308, agent 170 for each server 180 sends a decode request for the requested encoded multimedia content 185 through server remote access module 175 and over virtual channel 145 to its corresponding client's 110 client remote access module 130.

Moving to the client side, in step 310, client remote access module 130 for each client 110 sends the received decode request to its proxy 135. In step 311, proxy 135 for each client 110 processes the decode request to determine if its client multimedia application 120 has both access to encoded multimedia content 185 (e.g., access to the videoconferencing multimedia content on the other client 110) and the decoder(s) necessary to decode encoded multimedia content 185.

Once it is determined in decision step 312 that client multimedia application 120 of each client 110 has both access to encoded multimedia content 185 on the other client 110 and the decoder(s) necessary to decode encoded multimedia content 185, then the process proceeds to step 401 of FIG. 4.

In step 401, proxy 135 for each client 110 sends to server remote access module 175 of its corresponding server 180 through client remote access module 130 and over virtual channel 145 multimedia content information a notification that client multimedia application 120 has access to encoded multimedia content 185 and the decoder(s) necessary for decoding encoded multimedia content 185. Turning to the server side, in step 402, server remote access module 175 for each server 180 sends the notification and the multimedia content information to its agent 170. In step 403, agent 170 of each server 180 both loads a rendering screen on its server multimedia application 190 using the multimedia content information and also generates a corresponding color key. For example, the rendering screen that renders the video portion of the videoconference will display at the same position and same size as the video played back on the corresponding client 110 display. In step 404, agent 170 of each server 180 sends a playback command, configured to command client multimedia application 120 to begin playback of encoded multimedia content 185 (e.g., begin the videoconference), and the color key to client remote access module 130 of the corresponding client 110 via the server remote access module 175 and over virtual channel 145 between each client 110 and server 180 pair.

Returning to the client side, in step 405, client remote access module 130 of each client 110 sends the playback command and the color key to its proxy 135. In step 406, proxy 135 of each client 110 accesses encoded multimedia content 185 on the other client 110, and in step 407, proxy 135 for each client 110 processes the color key into a color key command. In step 408, proxy 135 for each client 110 sends encoded multimedia content 185, the playback command, and the color key command to its client multimedia application 120. From step 408, two separate paths, a first path with steps 409-410 and a second path with steps 411-412, are followed in parallel. In certain other aspects of the disclosure, the two paths may be followed serially.

In step 409, client multimedia application 120 for each client 110 calls on its necessary client decoder(s) to decode encoded multimedia content 185. In step 410, client multimedia application 120 for each client 110 plays the decoded multimedia content (e.g., begins the videoconference) according to the color key command. For example, using the same example discussed above with reference to step 403, for each client 110, the video portion of the videoconference is played on the client display in the same position and in the same size window as the rendering screen displayed on the corresponding server display. In certain embodiments, the proxy 135 and agent 170 for each client 110 are configured to use time stamps in order to compare and synchronize the playback of the encoded multimedia content 185 with the corresponding server 180. The process then proceeds to wait for a server event in step 701 or a client event in step 801, as described above.

In the second path proceeding from step 408, in step 411, proxy 135 for each client 110 sends a notification to server remote access module 175 of the corresponding server 180 via client remote access module 135 over virtual channel 145 that playback of encoded multimedia content 185 has begun (e.g., the videoconference has begun) on the corresponding client multimedia application 120. Returning to the server side, in step 412, server remote access module 175 for each server 180 sends the notification to its agent 170. The process then proceeds to wait for a server event in step 701 or a client event in step 801, as described above.

Accordingly, the disclosed embodiments of the present disclosure include both systems and methods. In accordance with one aspect of the disclosure, a system for receiving redirected electronic media playback includes a proxy configured to communicate with a remote access module, the remote access module configured to establish a remote access connection between the system and a remote system, the proxy further configured to receive, from the remote system over the remote access connection, at least one decode request for electronic media content designated for a local multimedia application on the system, the proxy further configured to provide, to the remote system over the remote access connection, a result of the at least one decode request, the proxy further configured to receive, from the remote system over the remote access connection, at least one playback command designated for playing the electronic media content on the local multimedia application, and the proxy further configured to provide, to the remote system over the remote access connection, a playback status of the electronic media content on the local multimedia application. The proxy is configured to allow the electronic media content to appear to be playing on a remote multimedia application on the remote system corresponding to the local multimedia application on the system, when the electronic media content is played on the local multimedia application.

In certain embodiments, the proxy is further configured to receive at least a portion of the electronic media content. In certain embodiments, the electronic media content comprises an electronic media file. In certain embodiments, the system comprises a telephone, a mobile intelligent device, a computer, a laptop computer, a thin client, a PDA, or a portable computing device. In certain embodiments, the at least a portion of the electronic media content is encoded. In certain embodiments, the at least a portion of the electronic media content is streamed from the remote system over the remote access connection. In certain embodiments, the remote access connection comprises a virtual channel, and wherein the at least one decode request, the result of the at least one decode request, the at least one playback command, and the playback status are sent over the virtual channel. In certain embodiments, the at least one decode request comprises a request for information on whether the local multimedia application has access to at least a portion of the electronic media content. In certain embodiments, the at least one decode request further comprises a request for information on whether the local multimedia application can decode at least a portion of the electronic media content. In certain embodiments, the result of the at least one decode request includes information on whether the local multimedia application has access to at least a portion of the electronic media content, and/or whether the local multimedia application can decode the at least a portion of the electronic media content. In certain embodiments, the proxy is further configured to receive a color key, wherein the color key comprises information on a rendering window displayed on a display of the remote system. In certain embodiments, the proxy is further configured to command the local multimedia application to play at least a portion of the electronic media content based on the color key. In certain embodiments, the proxy is further configured to execute an event command on the local multimedia application. In certain embodiments, the system is a computer further comprising a processor and the remote access module, and wherein the remote system is a computer comprising a second remote access module and an agent.

According to another aspect of the present disclosure, a system for redirecting electronic media playback includes an agent configured to communicate with a remote access module, the remote access module configured to establish a remote access connection between the system and a remote system, the agent configured to register with a local multimedia application on the system, the agent further configured to receive, from the local multimedia application, a playback request for electronic media content, the agent further configured to send, to the remote system over the remote access connection, at least one decode request for the electronic media content, the agent further configured to receive, from the remote system over the remote access connection, a result of the at least one decode request, and the agent further configured to send, to the remote system over the remote access connection, a playback command for the electronic media content. The playback request for the electronic media content is designated for the system and the playback command for the electronic media content is designated for the remote system. The system is configured to have the electronic media content played on the remote system as a result of the playback command.

In certain embodiments, the agent is configured to convert the playback request into the playback command. In certain embodiments, the agent is configured to register with the local multimedia application as at least one decoder. In certain embodiments, the agent is configured to command the local multimedia application to play at least a portion of the electronic multimedia content on the system if the remote access connection becomes unavailable. In certain embodiments, the agent is further configured to send at least a portion of the electronic media content to the remote system over the remote access connection. In certain embodiments, the at least a portion of the electronic media content is encoded. In certain embodiments, the at least a portion of the electronic media content is streamed to the remote system over the remote access connection. In certain embodiments, the agent is further configured to display a rendering screen on the local multimedia application. In certain embodiments, the agent is further configured generate a color key based on the rendering screen. In certain embodiments, the agent is further configured to send the color key to the remote system over the remote access connection.

In certain embodiments, the agent is further configured to encode at least a portion of the electronic multimedia content into a format decodable by a decoder accessible to a remote multimedia application of the remote system. In certain embodiments, the agent is further configured to send an event command to the remote system. In certain embodiments, the agent is further configured to execute an event command on the local multimedia application. In certain embodiments, the agent is further configured to automatically initiate redirection of playback of the electronic media content when the remote access connection is established between the system and the remote system so that the electronic media content appears to be playing on the multimedia application of the system when the electronic media content is played on a remote multimedia application of the remote system. In certain embodiments, the agent is configured to automatically initiate redirection of playback of the electronic media content without a user of the remote system performing configurations when the remote access connection is established between the system and the remote system.

According to a further aspect of the present disclosure, a method for receiving and playing redirected electronic media on a system includes communicating with a remote access module, the remote access module configured to establish a remote access connection between the system and a remote system and receiving, over the remote access connection, at least one decode request for electronic media content designated for a local multimedia application on the system. The method also includes providing, over the remote access connection, a result of the at least one decode request, and receiving, from the remote system over the remote access connection, at least one playback command designated for playing the electronic media content on the local multimedia application. The method further includes providing, to the remote system over the remote access connection, a playback status of the electronic media content on the local multimedia application. The system is configured to allow the electronic media content to appear to be playing on a remote multimedia application on the remote system corresponding to the local multimedia application on the system, when the electronic media content is played on the local multimedia application.

In certain embodiments, the method further includes receiving, from the remote system over the remote access connection, at least a decoded portion of the electronic media content, and playing the electronic media content on the local multimedia application. In certain embodiments, the method further includes receiving, from the remote system over the remote access connection, at least an encoded portion of the electronic media content, decoding the at least a portion of the electronic media content using the local multimedia application, and playing the electronic media content on the local multimedia application. In certain embodiments, the method further includes accessing at least a portion of the electronic media content using the local multimedia application, decoding the at least a portion of the electronic media content using the local multimedia application, and playing the electronic media content on the local multimedia application. In certain embodiments, the electronic media content includes videoconferencing content.

According to yet a further aspect of the present disclosure, a method for redirecting playback of electronic media to a remote system includes communicating with a remote access module, the remote access module configured to establish a remote access connection between a system and the remote system, and registering with a local multimedia application on the system. The method also includes receiving, from the local multimedia application, a playback request for electronic media content, and sending, over the remote access connection, at least one decode request for the electronic media content. The method further includes receiving, over the remote access connection, a result of the at least one decode request, and sending, over the remote access connection, a playback command for the electronic media content. The playback request for the electronic media content is designated for the system and the playback command for the electronic media content is designated for the remote system. The system is configured to have the electronic media content played on the remote system as a result of the playback command.

In another aspect of the present disclosure, a machine-readable medium encoded with instructions executable by a processor to perform a method for receiving and playing redirected electronic media is disclosed. The method includes communicating with a remote access module, the remote access module configured to establish a remote access connection between the system and a remote system, and receiving, over the remote access connection, at least one decode request for electronic media content designated for a local multimedia application on the system. The method also includes providing, over the remote access connection, a result of the at least one decode request, and receiving, from the remote system over the remote access connection, at least one playback command designated for playing the electronic media content on the local multimedia application. The method further includes providing, to the remote system over the remote access connection, a playback status of the electronic media content on the local multimedia application. The system is configured to allow the electronic media content to appear to be playing on a remote multimedia application on the remote system corresponding to the local multimedia application on the system, when the electronic media content is played on the local multimedia application.

In yet another aspect of the present disclosure, a machine-readable medium encoded with instructions executable by a processor to perform a method for redirecting playback of electronic media to a remote system is disclosed. The method includes communicating with a remote access module, the remote access module configured to establish a remote access connection between a system and the remote system, registering with a local multimedia application on the system, and receiving, from the local multimedia application, a playback request for electronic media content. The method also includes sending, over the remote access connection, at least one decode request for the electronic media content, and receiving, over the remote access connection, a result of the at least one decode request. The method further includes sending, over the remote access connection, a playback command for the electronic media content. The playback request for the electronic media content is designated for the system and the playback command for the electronic media content is designated for the remote system. The system is configured to have the electronic media content played on the remote system as a result of the playback command.

In a further aspect of the present disclosure, a system for receiving redirected electronic media playback includes means for communicating with a remote access module, the remote access module configured to establish a remote access connection between the system and a remote system. The system also includes means for receiving, over the remote access connection, at least one decode request for electronic media content designated for a local multimedia application on the system, and for providing, over the remote access connection, a result of the at least one decode request, and for receiving, from the remote system over the remote access connection, at least one playback command designated for playing the electronic media content on the local multimedia application, and for providing, to the remote system over the remote access connection, a playback status of the electronic media content on the local multimedia application. The system is configured to allow the electronic media content to appear to be playing on a remote multimedia application on the remote system corresponding to the local multimedia application on the system, when the electronic media content is played on the local multimedia application.

In another aspect of the present disclosure, a system for redirecting electronic media playback, includes means for communicating with a remote access module, the remote access module configured to establish a remote access connection between a system and the remote system, for receiving, from a local multimedia application on the system, a playback request for electronic media content, for sending, over the remote access connection, at least one decode request for the electronic media content, for receiving, over the remote access connection, a result of the at least one decode request; and for sending, over the remote access connection, a playback command for the electronic media content. The system also includes means for registering with the local multimedia application. The playback request for the electronic media content is designated for the system and the playback command for the electronic media content is designated for the remote system. The system is configured to have the electronic media content played on the remote system as a result of the playback command.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

Various modules and blocks may be arranged differently (e.g., arranged in a different order, or partitioned in a different way) all without departing from the scope of the subject technology. For example, various blocks in a communications module may be implemented in one or more different modules. A communications module, a processor and a memory may be arranged differently. For instance, a proxy, an agent, a client remote access module, and a server remote access module may be stored in a memory or data storage and/or executed by a processor. A processor may include a memory. Furthermore, a multimedia redirection system is not limited to a server-client architecture. For example, client 110 may be a server and server 180 may be a client; both client 110 and server 180 may be servers; and both client 110 and server 180 may be clients. Client 110 and server 180 may represent other architectures.

Furthermore, when information is discussed as being received, notified or accepted from/by a module or sent, issued, notified, transmitted, reported, provided or pushed to/from a module, it is understood that the information may be received, notified or accepted from/by the module or sent, issued, notified, transmitted, reported, provided or pushed to/from the module either directly or indirectly.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A server comprising:
a processor;
a server remote access module configured to enable a remote access connection between the server and a client;
a local multimedia application executing on the processor; and
an agent configured to communicate with the server remote access module using the processor, the agent configured to:
register with the local multimedia application;
receive, from the local multimedia application, a playback request for electronic media content;
enable sending, to the client over the remote access connection, at least one decode request for the electronic media content;
enable negotiations with a proxy on the client to determine whether the client can decode at least a portion of the electronic media content;
enable receiving, from the client over the remote access connection, a result of the at least one decode request based on the negotiations;
enable sending, to the client over the remote access connection, a playback command for the electronic media content; and
enable redirection of playback of the electronic media content automatically initiated over a virtual channel when the remote access connection is established between the server and the client to pass responsibility for processing the playback of the electronic media from the sever to the client so that the electronic media content appears to be playing on the multimedia application of the server when the electronic media content is played on a remote multimedia application of the client,
wherein the playback request for the electronic media content is designated for the server and the playback command for the electronic media content is designated for the client,
wherein the virtual channel is a separate communication channel from the remote access connection, and
wherein the agent is configured to command the local multimedia application to play at least a portion of the electronic multimedia content on the server if the remote access connection becomes unavailable.

2. The server of claim 1, wherein the agent is configured to convert the playback request into the playback command.

3. The server of claim 1, wherein the agent is configured to register with the local multimedia application as at least one decoder.

4. The server of claim 1, wherein the agent is further configured to enable sending at least a portion of the electronic media content to the client over the remote access connection.

5. The server of claim 1, wherein the server is configured to encode at least a portion of the electronic media content.

6. The server of claim 1, wherein the agent is configured to enable electronic media content to be streamed to the client over the remote access connection.

7. The server of claim 1, wherein the agent is further configured to enable displaying a rendering screen on the local multimedia application.

8. The server of claim 7, wherein the agent is further configured to generate a color key based on the rendering screen.

9. The server of claim 8, wherein the agent is further configured to enable sending the color key to the client over the remote access connection.

10. The server of claim 1, wherein the agent is further configured to encode at least a portion of the electronic multimedia content into a format decodable by a decoder accessible to a remote multimedia application of the client.

11. The server of claim 1, wherein the agent is further configured to enable sending an event command to the client.

12. The server of claim 1, wherein the agent is further configured to execute an event command on the local multimedia application.

13. The server of claim 1, wherein the agent is configured to enable redirection of playback of the electronic media content automatically initiated without a user of the client performing configurations when the remote access connection is established between the server and the client.

14. A method for redirecting playback of electronic media, comprising:
communicating with a server remote access module, the server remote access module configured to enable a remote access connection established between a server and a client;
registering with a local multimedia application executing on the server;
receiving, from the local multimedia application, a playback request for electronic media content;
sending, to the client, at least one decode request for the electronic media content;
negotiating with a proxy on the client to determine whether the client can decode at least a portion of the electronic media content;
receiving, from the client, a result of the at least one decode request based on the negotiations;
sending, to the client, a playback command for the electronic media content and
having redirection of playback of the electronic media content automatically initiated over a virtual channel when the remote access connection is established between the server and the client to pass responsibility for processing the playback of the electronic media from the sever to the client so that the electronic media content appears to be playing on the multimedia application of the server when the electronic media content is played on a remote multimedia application of the client,
wherein the playback request for the electronic media content is designated for the server and the playback command for the electronic media content is designated for the client,
wherein the virtual channel is a separate communication channel from the remote access connection, and
wherein the server system is configured to command the local multimedia application to play at least a portion of the electronic multimedia content on the server if the remote access connection becomes unavailable.

15. A non-transitory machine-readable medium encoded with instructions executable by a processor to perform a method for redirecting playback of electronic media, the method comprising:
communicating with a server remote access module configured to enable a remote access connection between a server and a client;
registering with a local multimedia application executing on the server;
receiving, from the local multimedia application, a playback request for electronic media content;
sending, to the client, at least one decode request for the electronic media content;
negotiating with a proxy on the client to determine whether the client can decode at least a portion of the electronic media content;
receiving, from the client, a result of the at least one decode request based on the negotiations;
sending, to the client, a playback command for the electronic media content; and
having redirection of playback of the electronic media content automatically initiated over a virtual channel when the remote access connection is established between the server and the client to pass responsibility for processing the playback of the electronic media from the sever to the client so that the electronic media content appears to be playing on the multimedia application of the server when the electronic media content is played on a remote multimedia application of the client,
wherein the playback request for the electronic media content is designated for the server and the playback command for the electronic media content is designated for the client,
wherein the virtual channel is a separate communication channel from the remote access connection, and
wherein the server is configured to command the local multimedia application to play at least a portion of the electronic multimedia content on the server if the remote access connection becomes unavailable.

16. A server comprising:
a memory storing processor-executable instructions; and
a processor enabled to access the memory, wherein the instructions, when executed by the processor, cause the processor to:
communicate with a server remote access module, the server remote access module configured to enable a remote access connection between the server and a client;
register with the local multimedia application;
receive, from a local multimedia application executing on the server, a playback request for electronic media content;
send, to the client, at least one decode request for the electronic media content;
negotiate with a proxy on the client to determine whether the client can decode at least a portion of the electronic media content;

receive, from the client, a result of the at least one decode request based on the negotiations;

send, to the client, a playback command for the electronic media content; and enable redirection of playback of the electronic media content automatically initiated over a virtual channel when the remote access connection is established between the server and the client to pass responsibility for processing the playback of the electronic media from the sever to the client so that the electronic media content appears to be playing on the multimedia application of the server when the electronic media content is played on a remote multimedia application of the client, wherein the playback request for the electronic media content is designated for the server and the playback command for the electronic media content is designated for the client, wherein the virtual channel is a separate communication channel from the remote access connection, and wherein the server is configured to command the local multimedia application to play at least a portion of the electronic multimedia content on the server if the remote access connection becomes unavailable.

17. The method of claim 14, further comprising converting the playback request into the playback command.

18. The method of claim 14, wherein registering with a local multimedia application on the server comprises registering as at least one decoder with the local multimedia application.

19. The method of claim 14, further comprising having at least a portion of the electronic media content sent to the client over the remote access connection.

20. The method of claim 14, further comprising encoding at least a portion of the electronic media content.

21. The method of claim 14, further comprising having electronic media content streamed to the client over the remote access connection.

22. The method of claim 14, further comprising displaying a rendering screen on the local multimedia application.

23. The method of claim 22, further comprising generating a color key based on the rendering screen.

24. The method of claim 23, further comprising having the color key sent to the client over the remote access connection.

25. The method of claim 14, further comprising encoding at least a portion of the electronic multimedia content into a format decodable by a decoder accessible to a remote multimedia application of the client.

26. The method of claim 14, further comprising having an event command sent to the client.

27. The method of claim 14, further comprising executing an event command on the local multimedia application.

28. The method of claim 14, further comprising having redirection of playback of the electronic media content automatically initiated without a user of the client performing configurations when the remote access connection is established between the server and the client.

29. The non-transitory machine-readable medium of claim 15, the method further comprising converting the playback request into the playback command.

30. The non-transitory machine-readable medium of claim 15, wherein registering with a local multimedia application on the server comprises registering as at least one decoder with the local multimedia application.

31. The non-transitory machine-readable medium of claim 15, the method further comprising having at least a portion of the electronic media content sent to the client over the remote access connection.

32. The non-transitory machine-readable medium of claim 15, the method further comprising encoding at least a portion of the electronic media content.

33. The non-transitory machine-readable medium of claim 15, the method further comprising having electronic media content streamed to the client over the remote access connection.

34. The non-transitory machine-readable medium of claim 15, the method further comprising displaying a rendering screen on the local multimedia application.

35. The non-transitory machine-readable medium of claim 34, the method further comprising generating a color key based on the rendering screen.

36. The non-transitory machine-readable medium of claim 35, the method further comprising having the color key sent to the client over the remote access connection.

37. The non-transitory machine-readable medium of claim 15, the method further comprising encoding at least a portion of the electronic multimedia content into a format decodable by a decoder accessible to a remote multimedia application of the client.

38. The non-transitory machine-readable medium of claim 15, the method further comprising having an event command sent to the client.

39. The non-transitory machine-readable medium of claim 15, the method further comprising executing an event command on the local multimedia application.

40. The non-transitory machine-readable medium of claim 15, the method further comprising having redirection of playback of the electronic media content automatically initiated without a user of the client performing configurations when the remote access connection is established between the server and the client.

41. The system of claim 16, wherein the processor is also configured to convert the playback request into the playback command.

42. The server of claim 16, wherein the processor is also configured to register with the local multimedia application as at least one decoder.

43. The server system of claim 16, wherein the processor is also configured to enable sending at least a portion of the electronic media content to the client over the remote access connection.

44. The server of claim 16, wherein the server is configured to encode at least a portion of the electronic media content.

45. The server of claim 16, wherein the processor is also configured to enable streaming of electronic media content to the client over the remote access connection.

46. The server of claim 16, wherein the processor is also configured to display a rendering screen on the local multimedia application.

47. The server of claim 46, wherein the processor is also configured to generate a color key based on the rendering screen.

48. The server of claim 47, wherein the processor is also configured to enable sending the color key to the client over the remote access connection.

49. The server of claim 16, wherein the processor is also configured to encode at least a portion of the electronic multimedia content into a format decodable by a decoder accessible to a remote multimedia application of the client.

50. The server of claim 16, wherein the processor is also configured to enable sending an event command to the client.

51. The server of claim 16, wherein the processor is also configured to execute an event command on the local multimedia application.

52. The server of claim 16, wherein the processor is also configured to enable redirection of playback of the electronic media content automatically initiated without a user of the client performing configurations when the remote access connection is established between the server and the client.

* * * * *